(12) United States Patent
Kim et al.

(10) Patent No.: US 11,949,096 B2
(45) Date of Patent: *Apr. 2, 2024

(54) POSITIVE ELECTRODE MATERIAL FOR RECHARGEABLE LITHIUM ION BATTERIES

(71) Applicants: UMICORE, Brussels (BE);
UMICORE KOREA LTD., Cheonan-si (KR)

(72) Inventors: Dae-Hyun Kim, Cheonan-si (KR); Jens Paulsen, Cheonan-si (KR); Shinichi Kumakura, Cheonan-si (KR); YuRi Lee, Cheonan-si (KR); Liang Zhu, Cheonan-si (KR); TaeHyeon Yang, Cheonan-si (KR)

(73) Assignees: UMICORE, Brussels (BE);
UMICORE KOREA LTD., Cheonan-si (KR)

(*) Notice: Subject to any disclaimer, the term of this patent is extended or adjusted under 35 U.S.C. 154(b) by 725 days.

This patent is subject to a terminal disclaimer.

(21) Appl. No.: 16/976,884

(22) PCT Filed: Feb. 25, 2019

(86) PCT No.: PCT/IB2019/051485
§ 371 (c)(1),
(2) Date: Aug. 31, 2020

(87) PCT Pub. No.: WO2019/166930
PCT Pub. Date: Sep. 6, 2019

(65) Prior Publication Data
US 2021/0005877 A1  Jan. 7, 2021

Related U.S. Application Data

(60) Provisional application No. 62/637,752, filed on Mar. 2, 2018.

(30) Foreign Application Priority Data

Jun. 5, 2018 (EP) .................................... 18175897

(51) Int. Cl.
| | | |
|---|---|---|
| H01M 4/131 | (2010.01) | |
| H01M 4/134 | (2010.01) | |
| H01M 4/36 | (2006.01) | |
| H01M 4/505 | (2010.01) | |
| H01M 4/525 | (2010.01) | |
| H01M 10/0525 | (2010.01) | |
| H01M 4/02 | (2006.01) | |

(52) U.S. Cl.
CPC .......... *H01M 4/364* (2013.01); *H01M 4/131* (2013.01); *H01M 4/134* (2013.01); *H01M 4/366* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ...... H01M 4/364; H01M 4/131; H01M 4/134; H01M 4/366; H01M 4/505; H01M 4/525; H01M 10/0525; H01M 2004/021; H01M 2004/028; H01M 4/62; H01M 10/052; C01G 51/06; C01G 53/00; C01G 51/42; C01G 53/006; C01G 53/42; C01G 53/50; C01P 2004/03; C01P 2002/20; C01P 2002/52; C01P 2004/51; C01P 2004/53; C01P 2004/54; C01P 2004/61; C01P 2006/40; Y02E 60/10
See application file for complete search history.

(56) References Cited

U.S. PATENT DOCUMENTS

| | | |
|---|---|---|
| 9,184,443 B2 | 11/2015 | Lee et al. |
| 2006/0257745 A1 | 11/2006 | Choi et al. |
| | (Continued) | |

FOREIGN PATENT DOCUMENTS

| | | |
|---|---|---|
| CN | 103022499 A | 4/2013 |
| CN | 105051945 A | 11/2015 |
| | (Continued) | |

OTHER PUBLICATIONS

USPTO; Non-Final Office Action for U.S. Appl. No. 16/955,906 dated May 7, 2021, 15 pages.
ISA/KR; International Search Report and Written Opinion for International Patent Application No. PCT/IB2019/051485 dated Jun. 25, 2019, 8 pages.
WIPO; International Preliminary Report on Patentability for International Patent Application No. PCT/IB2019/051485 dated Jun. 18, 2020, 5 pages.
EPO; Supplementary European Search Report for European Patent Application No. EP19761326 dated Dec. 20, 2021, 2 pages.
(Continued)

*Primary Examiner* — Muhammad S Siddiquee
(74) *Attorney, Agent, or Firm* — NK Patent Law

(57) ABSTRACT

A bimodal lithium transition metal oxide based powder mixture comprising a first and a second lithium transition metal oxide based powder. The first powder comprises a material A having a layered crystal structure comprising the elements Li, a transition metal based composition M and oxygen and has a particle size distribution with a span <1.0. The second powder has a monolithic morphology and a general formula $Li_{1+b}N'_{1-b}O_2$, wherein $-0.03 \leq b \leq 0.10$, and $N'=Ni_xM''_yCo_zE_d$, wherein $0.30 \leq x \leq 0.92$, $0.05 \leq y \leq 0.40$, $0.05 \leq z \leq 0.40$ and $0 \leq d \leq 0.10$, with M" being one or both of Mn or Al, and E being a dopant different from M". The first powder has an average particle size D50 between 10 and 40 µm. The second powder has an average particle size D50 between 2 and 4 µm. The weight ratio of the second powder in the bimodal mixture is between 20 and 60 wt %.

9 Claims, 5 Drawing Sheets

(56) References Cited

U.S. PATENT DOCUMENTS

| | | | |
|---|---|---|---|
| 2008/0076027 A1 | 3/2008 | Saito et al. | |
| 2009/0148772 A1 | 6/2009 | Kawasato et al. | |
| 2011/0049420 A1* | 3/2011 | Ellenwood | C01G 51/04 |
| | | | 252/182.1 |
| 2011/0226986 A1 | 9/2011 | Wang et al. | |
| 2012/0043500 A1 | 2/2012 | Xiang et al. | |
| 2014/0018439 A1* | 1/2014 | Gruner | C09D 5/36 |
| | | | 427/214 |
| 2014/0030588 A1 | 1/2014 | Hong et al. | |
| 2014/0212759 A1 | 7/2014 | Blangero et al. | |
| 2014/0377659 A1 | 12/2014 | Oljaca et al. | |
| 2015/0311512 A1* | 10/2015 | Paulsen | C01G 51/42 |
| | | | 429/219 |
| 2016/0099469 A1* | 4/2016 | Paulsen | H01M 4/525 |
| | | | 429/223 |
| 2016/0211517 A1 | 7/2016 | Beck et al. | |
| 2017/0288223 A1 | 10/2017 | Ogawa et al. | |
| 2017/0309902 A1 | 10/2017 | Jo et al. | |
| 2018/0019464 A1* | 1/2018 | Xia | H01M 4/366 |
| 2018/0123130 A1* | 5/2018 | Kim | H01M 4/366 |
| 2019/0221830 A1 | 7/2019 | Do et al. | |
| 2021/0399287 A1 | 12/2021 | Xia et al. | |

FOREIGN PATENT DOCUMENTS

| | | |
|---|---|---|
| CN | 107482211 A | 12/2017 |
| EP | 2405511 A2 | 1/2012 |
| JP | 11079751 A | 3/1999 |
| JP | 2004119218 A | 4/2004 |
| JP | 2005026218 A | 1/2005 |
| JP | 2005332713 A | 12/2005 |
| JP | 2006054159 A | 2/2006 |
| JP | 2006228733 A | 8/2006 |
| JP | 2014523840 A | 9/2014 |
| JP | 2015-149160 A | 8/2015 |
| JP | 2016162748 A | 9/2016 |
| JP | 2017536654 A | 12/2017 |
| KR | 10-2011-0086817 A | 8/2011 |
| KR | 10-2012-0061910 A | 6/2012 |
| KR | 20140098350 A | 8/2014 |
| KR | 10-2017-0118091 A | 10/2017 |
| WO | 2007108611 A1 | 9/2007 |
| WO | 2008084679 A1 | 7/2008 |
| WO | 2012107313 A1 | 8/2012 |
| WO | 2012171780 A1 | 12/2012 |
| WO | 2014090575 A1 | 6/2014 |
| WO | 2016116862 A1 | 7/2016 |
| WO | 2017013520 A1 | 1/2017 |
| WO | 2017042654 A1 | 3/2017 |
| WO | 2017042655 A1 | 3/2017 |
| WO | 2017189887 A1 | 11/2017 |

OTHER PUBLICATIONS

CNIPA; Office Action for Chinese Patent Application No. 201980016546.7 dated Dec. 2, 2022, 33 pages.

CNIPA; Office Action for Chinese Patent Application No. 201980016459.1 dated Nov. 18, 2022, 17 pages.

USPTO, Non-final Office Action for corresponding U.S. Appl. No. 17/007,464, dated Nov. 1, 2023, 19 pages.

* cited by examiner

10μm

1μm

10µm

10µm

POSITIVE ELECTRODE MATERIAL FOR RECHARGEABLE LITHIUM ION BATTERIES

CROSS-REFERENCE TO RELATED APPLICATIONS

This application is a U.S. National Stage application of International Patent Application No. PCT/IB2019/051485, filed on Feb. 25, 2019, which claims the benefit of European Patent Application No. 18175897.0, filed on Jun. 5, 2018, and claims the benefit of U.S. Provisional Patent Application No. 62/637,752, filed on Mar. 2, 2018.

TECHNICAL FIELD AND BACKGROUND

This invention relates to lithium transition metal oxide compounds that can be applied as a positive electrode material for rechargeable lithium ion batteries. More particularly, this material comprises a mixture of large spherical polycrystalline lithium transition metal oxide compounds and small single crystal lithium transition metal oxide compounds. The positive electrode material enhances the battery performance such as energy density due to its high volumetric density, and cycle stability due to its high compressive strength.

Since environmental pollution is a global threat due to a high degree of industrialization, the world is faced with threatening situations such as ozone depletion and the greenhouse effect. Since global environmental regulations are becoming more stringent, for transport, electric vehicles (EVs) are in the spotlight as an alternative based on green-energy resources. For being able to replace fossil fuel based vehicles, cars having an energy resource that is rechargeable and has a high energy density are essential. Lithium ion batteries (LIB) are the most promising candidate for such an energy resource.

$LiCoO_2$ (LCO) has been used as the positive electrode material for most LIB, for example for portable applications. The main reason is that it is easy to achieve very high electrode densities. This advantage comes together with low bulging, high capacities—especially if the charge voltage is increased, acceptable safety and cycle life. The high Co cost can be accepted because portable batteries are quite small. Even if the cobalt metal price would be 100$/kg then the cobalt cost of a 4 Ah smart phone battery cell would be less than or about 2.50$, which is a marginal cost compared to the price of the smartphone. The situation is different for the automotive applications where—if $LiCoO_2$ would be used—the cost of the metal in the battery would significant contribute to the total cost.

LCO is thus not sustainable for large batteries due to the limited cobalt resources—as approximately 30% of the cobalt production worldwide is currently already used for rechargeable batteries, according to the Cobalt Development Institute. Therefore, Lithium Nickel Cobalt Manganese Oxide (hereafter referred to as "NMC"), having roughly the stoichiometry LiM'O2, where $M'=N_{ix}Mn_yCo_z$, has become a promising positive electrode material due to its less critical resources situation. NMC contains less cobalt because it is replaced by nickel and manganese. Since nickel and manganese are cheaper and relatively more abundant than cobalt, NMC potentially replaces LCO in the large batteries.

An ideal positive electrode material for EVs should have a high gravimetric energy density (Wh/g) at relatively low voltage, and contribute to a high electrode density. The former means that positive electrode materials with higher Ni content are more desired while the latter means that a higher pressed density is required. Theoretically, higher Ni in NMC increases the capacity of the positive electrode material, resulting in higher gravimetric energy density. However, the higher the Ni content of the positive electrode material, the more brittle it becomes. Therefore, any attempt to achieve a high electrode density using high Ni cathode materials—i.e. a Ni content of ≥60 mol % of the transition metal content—is more challenging than when using low Ni material. It requires a new concept of material design than currently being used in batteries.

The volumetric energy density of positive electrode materials can be calculated by multiplying the gravimetric energy density (Wh/g) by the electrode density (g/cm³). The higher the electrode density, the more powder can be packed into a given volume thus increasing the available energy. As the electrode density correlates well with the pressed powder density of positive electrode materials, materials having a high pressed powder density are desired.

During the preparation of positive electrodes, a roll pressing step (called electrode calendaring step) is applied to compact the components in the electrode including the positive electrode material. The positive electrode material particle however can have a tendency to break, but the easier the powder can be compacted and the less brittle the particles are, the less frequent breaking will occur. When particle breaking occurs it can have severe consequences. The broken positive electrode materials will have a higher density as pores collapse, but also the surface area increases. The compacted electrode area is depleted of liquid electrolyte limiting the fast diffusion of lithium ions in the electrolyte, and resulting in a poor rate performance. The increased surface area is undesired because it increases the total area where undesired side reactions between the electrolyte and the positive electrode material can take place. An ideal positive electrode material thus has particles that are not brittle.

Generally, positive electrode powders are coated on both side of an aluminum foil that acts as substrate film and current collector. Basically, any positive electrode material can be pressed until the electrode density is sufficiently high if the pressure applied during the calendaring step is high enough. However, a too high pressure will damage the electrodes. Particularly, the aluminum foil gets damaged, become stretched and forms "waves". At the same time, positive electrode material particles are pressed into the aluminum foil, which we call the "electrode biting" effect. At such electrode biting points, the aluminum foil might rip apart or break during further processing. A suitable positive electrode material should be able to be compacted into high density electrodes already at low pressure—without electrode biting occurring.

Furthermore, the particle size distribution of the positive electrode material matters. Large particles tend to have a better pressed density. However, they also cause more electrode biting. The worst scenario occurs when positive electrode materials have only a few large particles. If a large particle is located on top of a smaller one, the small particle will easily penetrate deep into the aluminum foil and act as a knife. This effect can be minimized by limiting the maximum size (D99 or D100) of the particle size distribution.

It is an object of the present invention to provide a novel positive electrode material that has a high energy density based on a higher pressed density, without causing both particle breaking and electrode biting issues during the electrode manufacturing process and particle breaking issues during cycling in a battery.

SUMMARY OF THE INVENTION

In this invention, the particle size distribution (volume % vs. size) is measured by laser diffraction to quantify the relative volume percentage of the particles according to their size. The values of D10, D50, D90, D99 and D100 are defined as the particle size at 10%, 50%, 90%, 99% and 100% of the cumulative volumetric particle size distribution. The span of the particle size distribution, defined as (D90−D10)/D50, is used as an indicator of the width of the particle size variation.

Viewed from a first aspect, the invention can provide a bimodal lithium transition metal oxide based powder mixture for a rechargeable battery, comprising:
- a first lithium transition metal oxide based powder, comprising a material A having a layered crystal structure consisting of the elements Li, a transition metal based composition M and oxygen, the first powder having a particle size distribution with a span <1.0; and
- a second lithium transition metal oxide based powder having a monolithic morphology and a general formula: $Li_{1+b}N'_{1-b}O_2$, wherein −0.03≤b≤0.10, and $N'=Ni_xM''_yCo_zE_d$, wherein 0.30≤x≤0.92 0.05≤y≤0.40, 0.05≤z≤0.40 and 0≤d≤0.10, with M'' being either one or both of Mn or Al, and with E being a dopant different from M'', the first powder having an average particle size D50 between 10 and 40 μm, the second powder having an average particle size D50 between 2 and 4 μm; and wherein the weight ratio of the second powder in the bimodal mixture is between 15 and 60 wt %. The particles of the second powder may be lodged in the pores between the particles of the first powder.

Different embodiments have the following features:
- the bimodal powder mixture wherein the material A has particles having a general formula: $Li_{1+a}Co_{1-m}M'_mO_2$, with −0.05≤a≤0.05 and 0≤m≤0.05, and wherein M' is either one or more metals of the group consisting of Al, Ca, Si, Ga, B, Ti, Mg, W, Zr, Cr and V; and wherein in a particular embodiment the weight ratio of the second powder in the bimodal mixture is between 15 and 25 wt %;
- the bimodal powder mixture wherein the material A is polycrystalline and has particles having a general formula: $Li_{1+a'}M_{1-a'}O_2$, with −0.03≤a'≤0.10 and $M=Ni_{x'}Mn_{y'}Co_{z'}E'_{d'}$, wherein 0.30≤x'≤0.92, 0≤y'≤0.40, 0.05≤z'≤0.40, 0≤d'≤0.05 and x'+y'+z'+d'=1, and with E' is either one of more elements of the group consisting of Al, Ca, Si, Ga, B, Ti, Mg, W, Zr, Cr, V, S, F or N; and wherein in a particular embodiment the weight ratio of the second powder in the bimodal mixture is between 20 and 60 wt %;
- this last mentioned powder mixture may be composed of particles having a surface layer comprising an intimate mixture of the elements of M, LiF and $Al_2O_3$.
- in this last mentioned powder mixture the first powder may have an average particle size D50 between 10 and 25 μm and a span ≤0.8 or even ≤0.7;
- the bimodal powder mixture of previous embodiment, wherein 0.60≤x'≤0.92, 0≤y'≤0.30, 0.10≤z'≤0.30, and in a particular embodiment d'=0;
- the bimodal powder mixture wherein E is either one of more elements of the group consisting of Al, Ca, Si, Ga, B, Ti, Mg, W, Zr, Cr, V, S, F or N;
- the bimodal powder mixture wherein both the first and the second powder have an aspect ratio near to (or substantially equal to) 1, preferably equal to 1.0+/−0.1, more preferably equal to 1.00+/−0.01. In the framework of the present invention, the aspect ratio of a particle is determined by the evaluation of the particle circumference U, of the particle surface A and of the determination of the diameter derived from the respective size. The diameters referenced result from $$d_U = U/\pi \quad d_A = (4A/\pi)^{1/2}$$

The aspect ratio (f) of the particle is derived from the particle circumference U and the particle surface A according to the equation:

$$f = \left(\frac{d_A}{d_U}\right)^2 = \left(\frac{4\pi A}{U^2}\right)$$

In the case of an ideal spherical particle, $d_A$ and $d_U$ are equally large and a aspect ratio of one would result. The aspect ratio can generally be determined using for instance SEM images of the materials;
- the bimodal powder mixture having a first corrected pressed density ≥3.2 $g/cm^3$ or even $g/cm^3$, wherein the first corrected pressed density is calculated with the formula PD/100×(100+ID10); wherein PD is the pressed density under a pressure of 200 MPa and ID10 is the increase of the D10 value in the particle size distribution of the bimodal powder calculated as follows:

$$ID10 = \frac{D10 \text{ after } PDM - D10 \text{ before } PDM}{D10 \text{ before } PDM} \times 100 \text{ (in \%)},$$

wherein (D10 after PDM) and (D10 before PDM) are respectively the D10 values after and before the application of a pressure of 200 MPa;
- the bimodal powder mixture having a second corrected pressed density ≥3.0 $g/cm^3$ or even >3.2 and maybe even ≥3.3 $g/cm^3$, wherein the second corrected pressed density is calculated with the formula PD/100×(100−IB); wherein PD is the pressed density under a pressure of 200 MPa and IB is the increase of the specific surface area BET of the bimodal powder calculated as follows:

$$IB = \frac{BET \text{ after } PDM - BET \text{ before } PDM}{BET \text{ before } PDM} \times 100 \text{ (in \%)}$$

wherein (BET after PDM) and (BET before PDM) are respectively the BET values after and before the application of a pressure of 200 MPa.

Viewed from a second aspect, the invention can provide a positive electrode mixture for a rechargeable battery comprising the bimodal powder mixture of any one of the previously described embodiments, a binder and a conductive agent, wherein the weight ratio of the bimodal powder mixture in the positive electrode mixture is at least 90 wt %, and wherein the positive electrode mixture has a density of at least 3.65 $g/cm^3$ when pressed under 1765.2 N.

The present invention also concerns the following Embodiments 1 to 11:

1. A bimodal lithium transition metal oxide based powder mixture for a rechargeable battery, comprising:
   a first lithium transition metal oxide based powder, comprising particles of a material A having a layered crystal structure consisting of the elements Li, a transition metal based composition M and oxygen, the first powder having a particle size distribution characterized by a (D90−D10)/D50<1.0; and
   a second lithium transition metal oxide based powder, comprising a material B having single crystal particles, said particles having a general formula $Li_{1+b}N'_{1-b}O_2$, wherein −0.03≤b≤0.10, and $N'=Ni_xM''_yCo_zE_{d'}$, wherein 0.30≤x≤0.92 0.05≤y≤0.40, 0.05≤z≤0.40 and 0≤d≤0.10, with M" being either one or both of Mn or Al, and with E being a dopant different from M", the first powder having an average particle size D50 between 10 and 40 μm, the second powder having an average particle size D50 between 2 and 4 μm; and wherein the weight ratio of the second powder in the bimodal mixture is between 15 and 60 wt %.

2. The bimodal powder mixture of embodiment 1, wherein the particles of material A have a general formula $Li_{1+a}Co_{1-m}M'_mO_2$, with −0.05≤a≤0.05 and 0≤m≤0.05, the material A having a D50≥20 μm, and wherein M' is either one or more metals of the group consisting of Al, Ca, Si, Ga, B, Ti, Mg, W, Zr, Cr and V, and wherein the weight ratio of the second powder in the bimodal mixture is between 15 and 25 wt %.

3. The bimodal powder mixture of embodiment 1 or 2, wherein the material A is polycrystalline and has particles having a general formula $Li_{1+a'}M_{1-a'}O_2$, with −0.03≤a'≤0.10 and $M=Ni_{x'}Mn_{y'}Co_{z'}E'_{d'}$, wherein 0.30≤x'≤0.92, 0≤y'≤0.40, 0.05≤z'≤0.40, 0≤d'≤0.05 and x'+y'+z'+d'=1, and with E' is either one of more elements of the group consisting of Al, Ca, Si, Ga, B, Ti, Mg, W, Zr, Cr, V, S, F or N, and wherein the weight ratio of the second powder in the bimodal mixture is between 20 and 60 wt %.

4. The bimodal powder mixture of embodiment 3, wherein 0.60≤x'≤0.92, 0≤y'≤0.30, 0.10≤z'≤0.3.

5. The bimodal powder mixture of any one of embodiments 1 to 4, wherein E is either one of more elements of the group consisting of Al, Ca, Si, Ga, B, Ti, Mg, W, Zr, Cr, V, S, F or N.

6. The bimodal powder mixture of any one of claims 3 to 5, wherein the first powder has a particle size distribution characterized by an average particle size D50 between 10 and 25 μm and a (D90−D10)/D50≤0.8.

7. The bimodal powder mixture of any one of embodiments 1 to 6, wherein both the first and the second powder have an aspect ratio substantially equal to 1.

8. The bimodal powder mixture of any one of embodiments 1 to 7, wherein the bimodal powder has a first corrected pressed density ≥3.2 g/cm³, wherein the first corrected pressed density is calculated with the formula PD/100×(100+ID10); wherein PD is the pressed density under a pressure of 200 MPa and ID10 is the increase of the D10 value in the particle size distribution of the bimodal powder calculated as follows:

$$ID10 = \frac{D10 \text{ after } PDM - D10 \text{ before } PDM}{D10 \text{ before } PDM} \times 100 \text{ (in \%)}$$

wherein (D10 after PDM) and (D10 before PDM) are respectively the D10 values after and before the application of a pressure of 200 MPa.

9. The bimodal powder mixture of any one of embodiments 1 to 8, wherein the bimodal powder has a second corrected pressed density ≥3.0 g/cm³, wherein the second corrected pressed density is calculated with the formula PD/100×(100−IB); wherein PD is the pressed density under a pressure of 200 MPa and IB is the increase of the specific surface area BET of the bimodal powder calculated as follows:

$$IB = \frac{BET \text{ after } PDM - BET \text{ before } PDM}{BET \text{ before } PDM} \times 100 \text{ (in \%)}$$

wherein (BET after PDM) and (BET before PDM) are respectively the BET values after and before the application of a pressure of 200 MPa.

10. The bimodal powder mixture of any one of embodiments 3 or 4, wherein the particles of the powder mixture have a surface layer comprising an intimate mixture of the elements of M, LiF and $Al_2O_3$.

11. A positive electrode mixture for a rechargeable battery comprising the bimodal powder mixture of any one of embodiments 1 to 10, a binder and a conductive agent, wherein the weight ratio of the bimodal powder mixture in the positive electrode mixture is at least 90 wt % and wherein the positive electrode mixture has a density of at least 3.65 g/cm³ when pressed under 1765.2 N.

DETAILED DESCRIPTION

Figure 1:
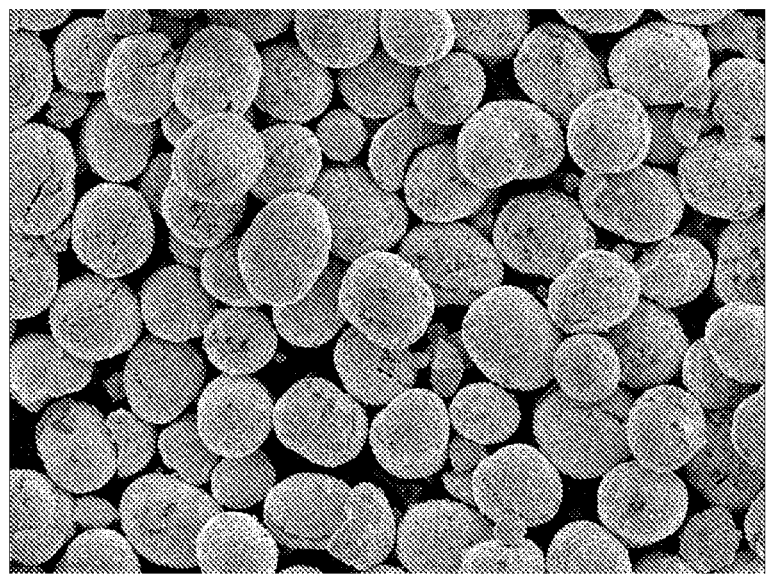
FIG. 1. FE-SEM image (magnification ×1000) of EX-A-01

Particles of conventional NMC positive electrode materials are usually spherical and always polycrystalline. For increasing the volumetric density, this invention provides a lithium transition metal oxide "bimodal PSD" compound—further referred to as Compound C—that can be used as positive electrode materials for lithium ion batteries, comprising a large regular spherical polycrystalline compound—further referred to as Compound A—and a small monolithic filler compound—further referred to as Compound B, within a certain weight ratio between compounds A and B. Since the particles of Compound A are spherical, there are pores among them. Theoretically, in a closed packing system of equal spherical particles, the maximum volume fraction of space occupied by the spherical particles is around 74%. The remaining 26% are pores that can be filled by smaller particles. Therefore, by using the right amount of smaller particles (Compound B) the volumetric density can be increased. Practically the volume of pores depends on the morphology of the matrix formed by Compound A. Compound B should fit well in the pores to maximize the volumetric density. As the fine particle fraction may have a very high specific surface area, it can contribute excessively to potential undesired side reactions with the electrolyte, causing a poor battery cycle life. The fine particles of the invention are more resistant against these side reactions as they have a smaller surface area. The positive electrode materials having a bimodal particle size distribution according to the invention also contribute to obtain a high pressed density, and the positive electrode material (Compound C) has a high energy density and less electrode processing issues such as particle breaking (or cracking) and electrode biting.

The particle size distribution of Compound C influences its flowability and compaction properties, and both the powder flowability and powder compactability matter in the electrode preparation to achieve a high electrode density. Larger particles typically flow more easily than smaller ones, and more spherical ones flow more easily than those having a high aspect ratio. The typical industrial process to prepare lithium transition metal composite oxides, including co-precipitation, screening, filtering, milling, and cyclone separation steps determine that the particle shape will be more or less spherical (with an aspect ratio close to one or not). However, normally the powder particle size varies a lot. The natural particle size distribution of this type of materials typically has a span of 1.20~1.50. A narrow span, in the present context, refers to a span smaller than 1. In practice, LIBs used for EVs require a certain D50 range of positive electrode materials to gain the best electrochemical performance, typically between 3 μm to 25 μm. For a positive electrode material with normal span, a large D50 means that large particles (such as particles having the volume corresponding to D99 or D100) may exceed or get close to the thickness of the positive electrode—which is normally thinner than 50 μm—with the risk of particle breaking, electrode biting, electrode detaching after calendaring etc., as the calendaring pressure is transferred by the largest particles onto smaller particles, creating locally a large force on the ductile aluminum foil. Applying a positive electrode material with narrow span, which is in this invention applicable for Compound A, allows to use powders with a larger D50 and a corresponding smaller D100, D99 or D99/D50, especially when the pressure during electrode calendaring is increased to reach a higher electrode density.

There are several possible preparation routes for obtaining a Compound A with narrow span. In a preferred embodiment, Compound A is prepared from a mixed transition metal precursor (referred as A1 hereafter). Practically, Compound A will have a similar particle size distribution and morphology as precursor A1. Therefore A1 has a narrow particle size distribution as well. A1 can be a mixed metal hydroxide, a mixed metal oxyhydroxide, a mixed metal oxide, a mixed metal carbonate, or mixtures of these. A1 is generally prepared by a precipitation process. For example, flows of dissolved metal salts like $MSO_4$ (M=Ni, Co, Mn) and dissolved base like NaOH are fed to a reactor under agitation. Additionally, additive flows like ammonia can be added to the reactor. A mixed transition metal hydroxide (MTH) product precipitates and it is filtered and dried. By applying a suitable process control, as for examples disclosed in U.S. Pat. No. 9,028,710, the precipitation process yields a narrow span precursor A1. Narrow span can be obtained by several ways including (a) batch precipitation, repeated batch precipitation or precipitation during continuous removal of mother slurry, (b) a reactor cascade, i.e. several reactors connected in series where the product of one reactor is fed to the next reactor, (c) continuous precipitation involving classification and back-feeding of particles, or (d) normal continuous precipitation. In the case of normal continuous precipitation, generally the mixed hydroxide does not have a narrow span morphology. However, the desired morphology is obtained by a separate classification step. The classification can be a wet (for example using a hydro-cyclone, draft tube etc.) or a dry (for example, by air classification) process. The classification can be done before the lithiation step or after the lithiation step, where A1 is blended with a source of lithium, followed by a one or more firing steps to prepare a lithium transition metal oxide (referred to as A2 hereafter). Finally, Compound A is prepared by the suitable post treatment of A2 such as milling, classification, or sieving.

Although Compound A with narrow span is preferred for above reasons, using Compound A with narrow span only is not beneficial to achieve high electrode density. The powder compact density is simply limited by the voids between particles with similar size. Particle breaking under excessive calendaring can improve the electrode density to some extent. However, particle breaking is not preferred for other reasons (as described before), such as cycle stability and side reactions during cycling. Therefore, the use of Compound A together with a smaller filler materials is still preferred to achieve high electrode density.

As said before, the disadvantage of the bimodal PSD is the high surface area of the small particles that can cause difficulties when making a slurry during the electrode coating process and also during cycling by an increase of side reactions with the electrolyte. In order to minimize the increase of the surface area in the product applying the bimodal PSD, the small particles need to have a smooth surface and a low open porosity. Since the surface area of the product can further increase during the calendaring process, the small particles should also be as hard as possible. Additionally, in-order to achieve a high density, the small particles should also be free of internal porosity. This leads to the use of "Monolithic" materials for Compound B that fulfil the above requirements. A "monolithic" morphology refers here to a morphology where a secondary particle contains only one primary particle. In the literature they are also called single crystal particles material, mono-crystal particles material, and one-body particles material. The preferred shape of the primary particle could be described as pebble stone shaped, having an aspect ratio near to (or substantially equal to) 1. The monolithic morphology can be achieved by using a high sintering temperature, a longer sintering time, and the use of a higher excess of lithium, as is disclosed for example in U.S. Pat. No. 9,184,443. Since monolithic materials have a smooth surface and less internal pores, the surface area is low and the particle strength is high. Monolithic positive electrode material are however not ready yet for the use as a large positive electrode material (Compound A) because the industrial technology is not mature enough. The production process of monolithic materials should be more optimized since it requires much higher and longer sintering temperature to get "large" monolithic positive electrode materials.

In the invention, the small monolithic particles (Compound B) may have a particle size distribution with 2 µm≤D50≤4 µm. When the average particle size is more than 4 µm, the battery performance is worsening and the filler effect is likely to be lost. If, on the contrary, the particle size is too small (i.e. <2 µm), it is difficult to prepare the powder using state of the art processes. For example, the powder cannot be sieved easily because of particle agglomeration. In addition, it is difficult to obtain product homogenously mixed with the large positive electrode materials due to agglomeration. In terms of the production process, a monolithic positive electrode material that has a D50 of around 3 µm can be produced by currently known industrial processes, as is disclosed for example in US2017/0288223. Effectively, there are many potential processes to produce monolithic Compound B. Basically the choice of precursor determines the details of the process. A typical process involves the blending of a transition metal precursor (referred to as B1) with a source of lithium, followed by firing and a carefully designed milling step. B1 can be a mixed metal hydroxide, a mixed metal oxyhydroxide, a mixed metal oxide, a mixed metal carbonate, or a mixtures of some of these. In this process, the PSD and the morphology of Compound B are mostly determined by the firing and milling conditions, and less by the PSD of the mixed transition metal precursor (B1). In particular, there is less need to supply a B1 powder which specially shaped particles.

Surprisingly, when monolithic Compound B is used as a filler, the particle breaking of Compound A with narrow span can be better suppressed by the buffering effect of the monolithic filler. Compound A is generally brittle since it is polycrystalline, and the higher the Ni content, the more brittle Compound A is. However, the occurrence of particle breaking of Compound A mixed with Compound B is very limited, even when Compound A has a high Ni content such as 87 mol % (vs. the total transition metal content). Less damage is expected for the electrode even after harsh calendaring, due to the synergetic effect of the components. Especially when 20% to 60% of monolithic Compound B is used with narrow span Compound A, the electrode density is the highest. Therefore, the product proposed in the invention is suitable for the application of high energy density electrodes. This approach differs from the state of art where the small particles are brittle and "sacrificed", during pressing the small particles break and fill the space between the large particles and thus, by a cushion effect the large particles are prevented from breaking. Surprisingly, the monolithic small particles—despite of being hard—also prevent the breaking of the large particles. The authors speculate that this property is related to an easy re-positioning and gliding due to the smooth surface and the special pebble stone type shape.

The positive electrode active material (Compound C) comprising Compound A with narrow span and monolithic Compound B can be prepared by different ways. The first straightforward way is the physical blending of Compound A and Compound B with the right fraction ratio (20~60 wt % of compound B). The physical blending can be done by any industrial blending equipment such as a Lödige blender. During the physical blend, any nano-scale additives can be blended together, since these might enable surface coating or enhance flowability. An additional heat treatment step after blending is possible. The second way is blending A1 (MTH), monolithic Compound B, and the source of lithium, followed by firing and post treatment. A lithium deficient Compound A' (for example, having a molar ratio of Li/M=0.80) can be used instead of A1. The amount of the source of lithium can be adjusted depending on the final Li/M ratio and the ratio in A'. The added lithium reacts with A1 or with lithium deficient Compound A during firing and Compound A is formed. Since the firing temperature is not as high as the firing temperature of monolithic Compound B, this firing step doesn't affect the property of monolithic Compound B.

Contrary to NMC, LCO works well even though the particles are large and of single crystal type. Single crystal LCO shows a good performance and there is no need to utilize polycrystalline compounds. Commercial LCO materials usually have a "potato" shape of spherical morphology and secondary particles consist of one or only very few crystallites.

The authors discover that the application of a monolithic NMC filler can also have great benefit for LCO based positive electrode materials as compound A. Especially, if the LCO particles are large (typically about 20 µm, more preferred about 25 µm or even 30 µm) and the PSD distribution has a narrow size distribution, mixing a monolithic NMC allows to further increase the electrode density. The highest pressed density is reached if the mass fraction of monolithic NMC is around 15-25%. Achieving a mass fraction of 15-25% monolithic NMC in an LCO based positive electrode material brings—besides high density— several additional benefits. First, since NMC has a higher capacity than LCO, the specific capacity increases. Second, NMC has a lower metal base cost (especially, lower Co content), which allows to lower the cost. Third, in special implementations, it can be desired to add the NMC before a final heating step as NMC can adsorb excess lithium from the LCO.

State of the art LCO is charged to high voltages. 4.35V is standard, 4.4V is available, and 4.45V is coming. The authors discover that a monolithic NMC filler works very well in mixtures with a LCO based positive electrode material even at high charge voltages. Particularly, a good cycle stability is achieved and no additional bulging is observed when storing such charged batteries at high temperature.

To conclude, the invention combines the following aspects:

1) As LIBs require a high energy density, it is possible to increase the volumetric energy density by using two or more positive electrode materials which have a different particle size. The choice of the sizes of the different positive electrode materials and their weight ratio are features of the invention.

2) Among the components of the positive electrode, the material having the biggest particle size determines the maximum particle size of the entire positive electrode material. As there is a tendency to increase the average particle size of positive electrode material, generally the volumetric density of the entire positive electrode increases. However, the maximum particle size should be as small as possible for electrode processing purposes.

3) Among the components of the positive electrode, the material having the smallest particle size determines the surface area of the entire positive electrode material. The surface area of positive electrode materials should be limited to avoid undesirable side reactions.

4) The particles of positive electrode materials can crack during electrode processing, i.e. the calendaring process, but also during cycling. The cracking of particles creates additional surface, resulting in the increase of surface area which is not desirable. Therefore, the positive electrode materials should be as hard as possible.

The evaluation of powders in real electrodes requires lots of work, i.e. slurry making, coating, drying etc. Therefore, these powders are usually investigated as such by a pressed powder density method which is widely applied in the industry. In the method, powders are filled into a mold and pressed with a defined force, for example 200 MPa, and the thickness of the obtained pellet is measured and using the known mass allows to calculate the powder density. Generally, there is a good correlation between the pressed powder density and the density of electrodes which have been calendared applying a corresponding force as used in the method above. This pressed density method can then be used to predict the electrode density.

To judge the degree of particle breaking and the increase of surface area after a calendaring process, both a PSD and surface area analysis (using BET theory) are performed before and after applying a certain pressure. The pressed density measurement in the invention applies a force of 200 MPa, which is a medium force and it is sufficiently high to break some of the particles if the positive electrode material has a normal brittleness. It is also low enough to avoid excessive compaction. For example, a powder which does not compact well under that pressure will not allow to achieve a high density. Thus, applying a pressure of 200 MPa allows to distinguish between positive electrode material powders which easily achieve a high density, and those which would need a higher force to be compacted. The latter powders will be the ones that cause electrode damage due to "biting". Therefore, the obtained density is a measure of the electrode density that can be achieved without excessively damaging the electrode.

Additionally, the pressure of 200 MPa allows to quantify the damage to a powder during the pressing. If the powder is very brittle and does not compact easily, particles will break. Similar breaking will happen in an electrode during calendaring. Avoiding powder damage is important to achieve a good cycle life because—besides avoiding damage to the alumina foil—broken particles increase the surface area, resulting in fast side reactions. Additionally, broken particles can have poor electrical contact. Finally, if broken particles are small, they can diffuse across the separator within the electrolyte and damage the anode. The breaking during electrode processing can be estimated from the powder pressing results. If particles break, finer particles are created. Therefore, the PSD changes and additional fresh surface area is created. The damage during powder pressing can be quantified by (1) analysis of the PSD curve before and after pressing and (2) by the increase of BET before and after pressing. The more the standard PSD curve moves left (caused by creating of smaller particles) and the more the BET increases, the more powder damage has happened. An easy approach to quantify particle breaking by PSD is by using the ID10 number. This number is defined as ID10= (D10 after PDM−D10 before PDM)/D10 before PDM (expressed in %) where PDM is the pressed density measurement described below. The value of ID10 is negative if particles break and finer particles are created. The larger the absolute value of this number is, the more fine particles have been created. Otherwise, if the powder compacts easily without breaking, the cushioning effects prevent breaking and the high density is obtained without major particle damage. In this case the absolute value of ID10 is near to zero. U.S. Pat. No. 8,685,289 describes the same method to evaluate the particle strength.

A similar approach is possible by quantifying damage due to the increase of BET by a number IB. This number is defined as IB=(BET after PDM−BET before PDM)/BET before PDM (expressed in %). IB is usually positive and the smaller IB is, the less particle damage happened.

The following analysis methods are used in the Examples:
A) Pressed Density Measurement (PDM)

The pressed density (PD) is measured as follows: 3 g of powder is filled in a pellet die with a diameter "d" of 1.3 cm. A uniaxial pressure of 200 MPa, is applied to the pellet for 30 seconds. After relaxing the load, the thickness "t" of the pressed pellet is measured. The pressed density is then calculated as follows:

$$PD = \frac{3}{\pi\left(\frac{d}{2}\right)^2 t} \text{(in g/cm}^3\text{)}$$

After pressing, the powder is further investigated by "B) BET analysis" and "C) PSD measurement".

B) BET Analysis

The specific surface area of the powder before and after A) PD measurement is analyzed with the Brunauer-Emmett-Teller (BET) method using a Micromeritics Tristar 3000. A powder sample is heated at 300° C. under a nitrogen ($N_2$) gas for 1 hour prior to the measurement in order to remove adsorbed species. The dried powder is put into the sample tube. The sample is then de gassed at 30° C. for 10 min. The instrument performs the nitrogen adsorption test at 77K. As obtaining the nitrogen isothermal absorption/desorption curve, the total specific surface area of the sample in $m^2/g$ is yielded.

A change of the BET specific surface area before and after pressing under 200 MPa is calculated as follows:

$$BET \text{ increase } (IB) = \frac{BET \text{ after } PDM - BET \text{ before } PDM}{BET \text{ before } PDM} \times 100 \text{ (in \%)}$$

PDM: Pressed density measurement under a pressure of 200 MPa

C) PSD Measurement

The particle-size distribution (PSD) of the powder before and after A) PD measurement is analyzed using a Malvern Mastersizer 3000 with Hydro MV wet dispersion accessory after dispersing the powder in an aqueous medium. In order to improve the dispersion of the powder in the aqueous medium, sufficient ultrasonic irradiation and stirring are applied and an appropriate surfactant is introduced. A change of the D10 before and after pressing under 200 MPa is calculated as follows:

$$D10 \text{ increase } (ID10) = \frac{D10 \text{ after } PDM - D10 \text{ before } PDM}{D10 \text{ before } PDM} \times 100 \text{ (in \%)}$$

The effect on both the pressed density by the D10 increase (or decrease) and the BET increase can be used as a good criterion to quantify the damage to a powder under a pressure of 200 MPa. The obtained "corrected PD's" of the products of the invention have a value of g/cm³ for "PD×(100+ID10)÷100" and a value ≥3.0 g/cm³ for "PD×(100−IB)÷100".

D) FE-SEM Analysis

The morphology of a material is analyzed by a Scanning Electron Microscopy (SEM) technique. The measurement is performed with a JEOL JSM 7100F scanning electron microscope equipment under a high vacuum environment of $9.6 \times 10^{-5}$ Pa at 25° C. The images of samples are recorded with several magnifications (×1,000 to 10,000) to demonstrate the monolithic structure of materials. To define the monolithic property, the number of primary particles in a secondary particle is measured on a SEM image (with a magnification of 5000 times) of ten randomly selected secondary particles. Since a SEM image only shows the morphology of powders from a top view, the counting of primary particles is performed within a visible range in a SEM image.

E) Electrode Density Analysis

A positive electrode is prepared by the following procedure: positive electrode active material, Super-P (Super-P™ Li commercially available from Timcal), and graphite (KS-6 commercially available from Timcal) as conductive agents and polyvinylidene fluoride (PVdF 1710 commercially available from Kureha) as a binder are added to NMP (N-methyl-2-pyrrolidone) as a dispersion medium. The mass ratio of the positive electrode material, Super-P, graphite, and the binder may be set at 95/3/1/2. Thereafter, the mixture is kneaded to prepare a positive electrode mixture slurry, and the slurry is coated onto both sides of a positive electrode current collector, which is a 20 μm-thick aluminum foil. The electrode is then dried. The thickness of the electrode before calendaring is around 160 μm. The calendaring is done by a commercial roll presser (from Roh-tech). The roll presser has two metal rolls with a diameter of 25 cm. The dried electrode passes through the roll presser with the setting pressure of 180 Kgf (1765.2 N) and the setting gap between two rolls of 0.

The electrode density can be calculated by the following equation:

$$\text{Electrode density} = \frac{\text{Weight of a positive electrode} - \text{Weight of Al foil}}{(\text{Thickness of a positive electrode} - \text{Thickness of Al foil}) \times \text{Area of positive electrode}} \text{ (in g/cm}^3\text{)}$$

F) Quantification of Electrode Biting

The cross-section of an electrode prepared for analysis method E) is treated by an ion beam cross-section polisher (CP) instrument, which is a JEOL (IB-0920CP), using argon gas as beam source. The positive electrode is attached onto an aluminum foil. The aluminum foil is attached to the sample holder and placed in the instrument. The voltage is set as 6.5 kV with a duration of 3.5 hours. The cross-section of the positive electrode is analyzed by FE-SEM analysis. Each four cross-section FE-SEM images with a magnification of ×1000 are obtained and the (cross-sectional) area of Al foil in the obtained images is analyzed by a software called "ImageJ". The relative area of aluminum foil is used as a criteria to quantify the degree of electrode biting after calendaring.

H) Coin Cell Testing

For the preparation of a positive electrode, a slurry that contains electrochemical active material, conductor (Super P, Timcal), binder (KF #9305, Kureha)—with a formulation of 90:5:5 by weight—in a solvent (NMP, Mitsubishi) is prepared by a high speed homogenizer. The homogenized slurry is spread on one side of an aluminum foil using a doctor blade coater with a 230 μm gap. The slurry-coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as a negative electrode. 1M $LiPF_6$ in EC/DMC (1:2) is used as electrolyte and is dropped between separator and electrodes. Then, the coin cell is completely sealed to prevent leakage of the electrolyte.

The coin cell test in the present invention, which is a conventional "constant cut-off voltage" test, follows the schedule shown in Table 1.

TABLE 1

| | Coin cell testing method | | | | | | | |
|---|---|---|---|---|---|---|---|---|
| | Charge | | | | Discharge | | | |
| Cycle No | C Rate | End current | Rest (min) | V/Li metal (V) | C Rate | End current | Rest (min) | V/Li metal (V) |
| 1 | 0.10 | — | 30 | 4.3 | 0.10 | — | 30 | 3.0 |

Each cell is cycled at 25° C. using a Toscat-3100 computer-controlled galvanostatic cycling station (from Toyo). The coin cell testing procedure uses a 1 C current definition of 160 mA/g. DQ1 (mAh/g) is the discharge capacity of the first cycle. A coin cell energy density can be calculated by the following equation:

Coin cell energy density (mWh/cm³)=Energy1 (mWh/g)×PD (g/cm³)

where energy is the integrated area of the capacity-voltage plot in the first cycle and PD is the pressed powder density measured by above "A) Pressed density measurement (PDM)".

I) Full Cell Testing

I1) Full Cell Preparation 650 mAh or 1600 mAh pouch-type cells are prepared as follows: the positive electrode material, Super-P (Super-P, Timcal), graphite (KS-6, Timcal) as positive electrode conductive agents and polyvinylidene fluoride (PVDF 1710, Kureha) as a positive electrode binder are added to N-methyl-2-pyrrolidone (NM P) as a dispersion medium so that the mass ratio of the positive electrode active material powder, positive electrode conductive agents (super P and graphite) and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 μm thick aluminum foil. The typical loading weights of a positive electrode active material is about 11.5±0.2 mg/cm² for 650 mAh cells and 14.0±0.2 mg/cm² for 1600 mAh cells. The electrode is then dried and calendared using a pressure of 120 kgf (1176.8 N). In addition, an aluminum plate serving as a positive electrode current collector tab is arc-welded to an end portion of the positive electrode.

Commercially available negative electrodes are used. In short, a mixture of graphite, carboxy-methyl-cellulose-sodium (CMC), and styrenebutadiene-rubber (SBR), in a mass ratio of 96/2/2, is applied on both sides of a 10 μm thick copper foil. A nickel plate serving as a negative electrode current collector tab is arc-welded to an end portion of the negative electrode. A typical loading weight of a negative electrode active material is 8±0.2 mg/cm$^2$. Non-aqueous electrolyte is obtained by dissolving lithium hexafluorophosphate (LiPF$_6$) salt at a concentration of 1.0 mol/L in a mixed solvent of ethylene carbonate (EC), ethylmethyl carbonate (EMC), diethyl carbonate (DEC) in a volume ratio of 1:1:1.

A sheet of positive electrode, negative electrode, and a separator made of a 20 μm thick microporous polymer film (Celgard® 2320, Celgard) interposed between them are spirally wound using a winding core rod in order to obtain a spirally-wound electrode assembly. The assembly and the electrolyte are then put in an aluminum laminated pouch in an dry room with dew point of −50° C., so that a flat pouch-type lithium secondary battery is prepared. The non-aqueous electrolyte solution is impregnated for 8 hours at room temperature. The battery is pre-charged to 15% of its expected capacity and aged for a day at room temperature. The battery is then degassed and the aluminum pouch is sealed. The battery is prepared for use as follows: the battery is charged using a current of 0.2 C in CC mode (constant current) up to the target voltage, then in CV mode (constant voltage) until a cut-off current of C/20 is reached, before the discharge in CC mode at 0.5 C rate, down to a cut-off voltage.

I2) Cycle Life Test

The prepared full cell battery is charged and discharged several times under the following conditions at 25° C. or 45° C. to determine the charge-discharge cycle performance:

Charging is performed in CC mode under 1 C rate up to target voltage, then CV mode until C/20 is reached,
The cell is then set to rest for 10 minutes,
The discharge is done in CC mode at 1 C rate down to a cut-off voltage,
The cell is then set to rest for 10 minutes,
The charge-discharge cycles proceed until the battery reaches 80% retained capacity.

Every 100 cycles, one discharge is done at 0.2 C rate in CC mode down to a cut-off voltage. If 80% retained capacity is not reached by the end of the normal number of cycles, an expected cycle number to obtain 80% retained capacity is calculated by a linear trend line.

I3) Full Cell Bulging Test

Batteries prepared by above preparation method are fully charged until target voltage and inserted in an oven which is heated to 90° C., where they stay for 4 hours. At 90° C., the charged positive electrode reacts with the electrolyte and creates gas, which in turn creates bulging of the battery's casing. The increase of thickness ((thickness after storage-thickness before storage)/thickness before storage) is measured after 4 hours and defined as "full cell bulging" value.

The invention is further exemplified in the following examples:

Manufacturing Example 1

This example illustrates a manufacturing processes to produce large polycrystalline lithium transition metal oxides with very high Ni content—i.e. a Ni content of ≥80 mol % of the total transition metal content—that are used as Compound A in the examples. EX-A-01, EX-A-02 and CEX-A-01 have the same composition of Li(Ni$_{0.87}$Mn$_{0.03}$Co$_{0.10}$)O$_2$ and are prepared by the following steps:

1) Precipitation of a mixed transition metal hydroxide: The MTHs which have a narrow span PSD (MTH of EX-A-01 and EX-A-02) are prepared using a continuous stirred tank reactor (CSTR) precipitation technique with manual back-feeding. The temperature of the CSTR is fixed at 60° C. A 2M MSO$_4$ solution (M=Ni$_{0.87}$Mn$_{0.03}$Co$_{0.10}$), 10M NaOH solution, and 12M NH$_4$OH solution with a flow rate of 2 L/hour, 0.9 L/hour, and 0.4 L/hour respectively, are continuously fed into a 10 L reactor with a residence time of 3 hours. The CSTR is continuously stirred through an impeller at 1000 RPM. The precursor slurry is collected through an overflow at each hour. The collected precursor slurry is settled down and 2.8 L of clear mother-liquor is dumped. The remaining 0.5 L thick slurry is manually back-fed into the CSTR at each hour. During this procedure, the PSD of the precursor inside the CSTR is measured. When the D50-particle size of the precursor reaches first 15 μm, and afterwards 20 μm, each time 5 L of precursor slurry is collected. The collected precursor slurry is filtered and washed by de-ionized water, and then dried at 150° C. for 20 hours under N$_2$ atmosphere, obtaining the MTH (Ni$_{0.87}$Mn$_{0.03}$Co$_{0.10}$O$_{0.19}$(OH)$_{1.81}$) for EX-A-01 and EX-A-02. The MTH (Ni$_{0.87}$Mn$_{0.03}$Co$_{0.10}$O$_{0.23}$(OH)$_{1.77}$) of CEX-A-01 is prepared by the same procedure as above, but without performing the manual back-feeding, resulting in a normal span.

2) Blending: the prepared MTHs are blended with LiOH as a source of lithium, with a target molar Li/M' ratio of 1.00, though a dry blending method.

3) Firing: 300 g of each mixture from step 2) is loaded in an alumina tray and fired at 750° C. under O$_2$ atmosphere for 12 hours in a chamber furnace (Direct sintering) to obtain the sintered products.

4) Post treatment: the sintered products are grinded, sieved to avoid the formation of agglomerates and labelled EX-A-01, EX-A-02, and CEX-A-01.

Table 2 describes the PSD of the precursors and the PSD, PD, and ID10 (D10 increase after pressing) of Compound A. FIG. 1 shows a FE-SEM image of EX-A-01.

TABLE 2

Large polycrystalline very high Ni NMCs which have different PSD

| Compound A ID | PSD of precursor (MTH) | | PSD of product (Compound A) | | PD g/cm$^3$ | ID10 % |
| --- | --- | --- | --- | --- | --- | --- |
| | D50 μm | SPAN | D50 μm | SPAN | | |
| EX-A-01 | 15 | 0.7 | 14 | 0.7 | 3.29 | −24.0 |
| EX-A-02 | 20 | 0.7 | 19 | 0.7 | 3.35 | −46.0 |
| CEX-A-01 | 13 | 1.5 | 13 | 1.5 | 3.47 | −35.5 |

Manufacturing Example 2

This example illustrates a manufacturing process to produce large polycrystalline lithium transition metal oxides with high Ni—i.e. a Ni content of between 60 and 80 mol % of the transition metal content—that are used as Compound A in the examples. The MTH (Ni$_{0.625}$Mn$_{0.175}$Co$_{0.20}$O$_{0.29}$(OH)$_{1.71}$) for EX-A-03 is made by the process described in Manufacturing example 1 except that a MSO$_4$ solution with M=Ni$_{0.625}$Mn$_{0.175}$Co$_{0.200}$ is used and the target D50 is 11

µm. EX-A-03, with formula $Li_{1.01}(Ni_{0.625}Mn_{0.175}Co_{0.200})_{0.99}O_2$, is obtained through a double sintering process—as discussed in the patent application WO2017-042654. The process includes two separate sintering steps and runs as follows:

1) 1$^{st}$ blending: to obtain a lithium deficient sintered precursor, $Li_2CO_3$ and the MTH are homogenously blended with a Li/M ratio of 0.85, in a Henschel mixer for 30 minutes.

2) 1$^{st}$ sintering: the blend from the 1$^{st}$ blending step is sintered at 890° C. for 12 hours in an oxygen containing atmosphere in a chamber furnace. After the 1$^{st}$ sintering, the sintered cake is crushed, classified and sieved to powder so as to prepare it for the 2$^{nd}$ blending step. The product obtained from this step is a lithium deficient sintered precursor, meaning that the Li/M stoichiometric ratio in $LiMO_2$ is less than 1.

3) 2$^{nd}$ blending: the lithium deficient sintered precursor is blended with $LiOH.H_2O$ in order to correct the Li stoichiometry to Li/M=1.02. The blending is performed in a Henschel mixer for 30 minutes.

4) 2$^{nd}$ sintering: the blend from the 2$^{nd}$ blending is sintered at 840° C. for 10 hours in an oxygen containing atmosphere in a chamber furnace.

5) Post-treatment: the 2$^{nd}$ sintered product is grinded and sieved to avoid the formation of agglomerates. The final product is high Ni NMC polycrystalline $Li_{1.01}(Ni_{0.625}Mn_{0.175}Co_{0.200})O_2$ and labelled as EX-A-03.

CEX-A-02 is a commercial product "CellCore HX12" produced by Umicore. It is produced with the MTH precursor prepared by a typical industrial CSTR precipitation and the double sintering process described above. The composition is $Li_{1.01}(Ni_{0.60}Mn_{0.20}Co_{0.20})_{0.99}O_2$ EX-A-04 is a fraction of large particles separated from CEX-A-02 in an air fractionation process. NPK Corporation proceeds the air fractionation of CEX-A-02. 20% of heavier particles are collected by the air fractionation. The composition of EX-A-04 is $Li_{1.01}(Ni_{0.625}Mn_{0.175}Co_{0.200})_{0.99}O_2$ which is slightly different with CEX-A-02 due to the MTH design. Table 3 describes the PSD of precursors and the PSD, PD, ID10 (D10 increase after pressing) and IB (BET increase after pressing) of the different Compound A's.

TABLE 3

Large polycrystalline high Ni NMCs which have different PSD

| Compound A ID | PSD of precursor (MTH) D50 µm | SPAN | PSD of product (Compound A) D50 µm | SPAN | PD g/cm³ | ID10 % | IB % |
|---|---|---|---|---|---|---|---|
| EX-A-03 | 11 | 0.6 | 11 | 0.6 | 3.10 | −16.6 | 22 |
| EX-A-04 | Fractionated | | 20 | 0.7 | 3.43 | −78.5 | 133 |
| CEX-A-02 | 12 | 1.2 | 12 | 1.2 | 3.32 | −32.6 | 57 |

From the data of EX-A-01 to 04 and CEX-A-01 & 02, it is clear that these have ID10 values that are very negative and IB values that are very high. Negative ID10 means that the D10 of the compounds decreases after pressing because of particle breaking. Therefore, the surface area after pressing should increase because the fine particles that are generated have a higher surface area. Higher surface areas results in excessive side reactions during cycling, which jeopardizes the use as positive electrode material.

Manufacturing Example 3

This example illustrates a manufacturing processes to produce small lithium transition metal oxides, which are used as Compound B in the examples. A monolithic high Ni NMC powder (EX-B-01, EX-B-02, CEX-B-01, CEX-B-02), having the target formula $Li_{1.01}(Ni_{0.625}Mn_{0.175}Co_{0.200})_{0.99}O_2$ is obtained through a double sintering process which is a solid state reaction of a lithium source, usually $Li_2CO_3$ or LiOH, and a MTH prepared by the process described in KR101547972B1, which composition is $Ni_{0.625}Mn_{0.175}Co_{0.200}O_{0.43}(OH)_{1.57}$. The MTH has a D50 of around 4 µm. The process includes two separate sintering steps and runs as follows:

1) 1$^{st}$ blending: to obtain a lithium deficient sintered precursor, $LiOH.H_2O$ and the MTH are homogenously blended with a Li/N' ratio of 0.90 in a Henschel mixer for 30 minutes.

2) 1$^{st}$ sintering: the blend from the 1$^{st}$ blending step is sintered at 750° C. for 12 hours under O2 atmosphere in a chamber furnace. The product obtained from this step is a powderous lithium deficient sintered precursor with Li/N'=0.90.

3) 2$^{nd}$ blending: the lithium deficient sintered precursor is blended with $LiOH.H_2O$ in order to correct the Li stoichiometry (Li/N'=1.02). The blending is performed in a Henschel mixer for 30 minutes.

4) 2$^{nd}$ sintering: the blend from the 2$^{nd}$ blending is sintered at different temperatures as described in Table 4 for 10 hours in an oxygen containing atmosphere in a chamber furnace.

5) Post-treatment: the 2$^{nd}$ sintered products are heavily grinded by a milling process to avoid the formation of agglomerates. The final products are high Ni NMC monolithic oxides with formula $Li_{1.01}(Ni_{0.625}Mn_{0.175}Co_{0.200})_{0.99}O_2$ and are labelled EX-B-01, EX-B-02, CEX-B-01 and CEX-B-02.

Figure 2:
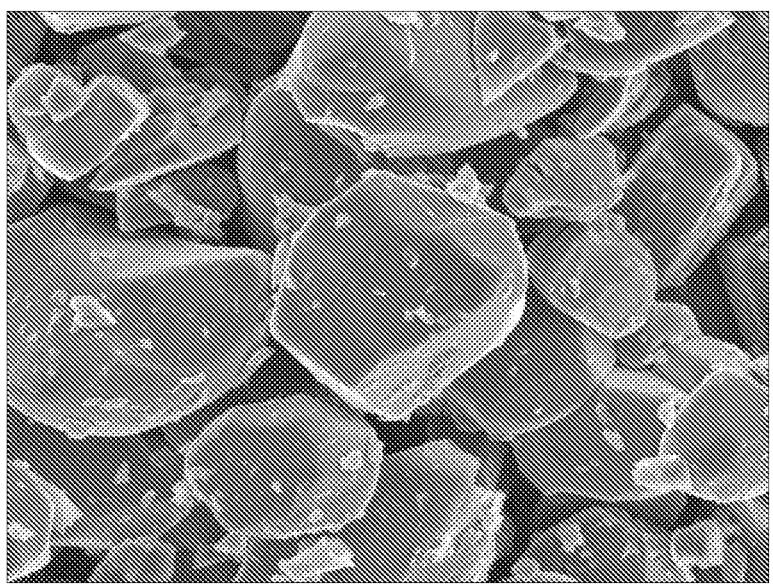
FIG. 2. FE-SEM image (magnification ×10000) of EX-B-02

CEX-B-03 is a commercial product (CellCore ZX3) from Umicore having a medium Ni content (<60 mol %), which composition is $Li_{1.03}(Ni_{0.38}Mn_{0.29}Co_{0.33})_{0.97}O_2$. It is obtained using the MTH produced by a typical CSTR precipitation process and standard direct solid state reaction between $Li_2CO_3$ and MTH in an oxygen containing atmosphere. CEX-B-04 is a commercial product (CellCore QX5) from Umicore with a very high Ni content, which composition is $Li_{1.01}(Ni_{0.80}Co_{0.15}Al_{0.05})_{0.99}O_2$. It is obtained using the MTH produced by a typical CSTR precipitation process and standard direct solid state reaction between $LiOH.H_2O$ and MTH under O2 atmosphere. Table 4 describes the morphology, PSD, PD, ID10 (D10 increase after pressing) and IB (BET increase after pressing) of the different Compound B's. FIG. 2 shows a FE-SEM image of EX-B-02.

TABLE 4

Small NMCs which have different morphology, PSD, and compositions

| Compound B ID | 2$^{nd}$ sintering Temp. ° C. | Morphology | PSD of product (Compound B) D50 μm | SPAN | PD g/cm$^3$ | ID10 % | IB % |
|---|---|---|---|---|---|---|---|
| EX-B-01 | 900 | Monolithic | 2.6 | 1.1 | 3.15 | −6.3 | 7 |
| EX-B-02 | 930 | Monolithic | 3.3 | 1.2 | 3.23 | −4.5 | 14 |
| CEX-B-01 | 945 | Monolithic | 4.7 | 1.1 | 3.20 | NA | NA |
| CEX-B-02 | 980 | Monolithic | 7.1 | 1.2 | 3.27 | −7.0 | 26 |
| CEX-B-03 | — | Polycrystalline | 2.9 | 1.1 | 3.05 | −48.3 | 42 |
| CEX-B-04 | — | Polycrystalline | 5.6 | 1.1 | 3.30 | −42.9 | 79 |

NA: not available

The table shows that when the temperature of the second sintering step increases the final product becomes coarser, in fact the temperature used for CEX-B-02 is so high that a very coarse monolithic product is obtained. The polycrystalline products have a very negative ID10 and a very high IB value.

Example 1

This example illustrates the benefit of a bimodal composition comprising large lithium transition metal oxides having a narrow span and monolithic small lithium transition metal oxides. All products in Example 1 (Compound C) are obtained by a simple blending process using Compounds A and B which are described in Manufacturing Examples 1 and 3. Based on the fraction of B in Tables 5a~5d, Compound A and Compound B are weighed in vials and the vials are shaken by a tubular mixer. The obtained Compound C samples are analyzed by PD and PSD measurement and the results are shown in Table 5a~5d. The Tables also give a value for PD/100*(100+ID10) (in g/cm$^3$), expressing how the pressed density is influenced by the brittleness of the particles.

TABLE 5a

PD and ID10 of Compound C from polycrystalline Compound A with narrow span and monolithic Compound B in Example 1 (referred to as "EX1")

| Comp. C ID | Comp. A | Comp. B | Fr B % | PD g/cm$^3$ | ID10 % | PD/100 * (100 + ID10) g/cm$^3$ |
|---|---|---|---|---|---|---|
| EX1-01 | EX-A-01 | EX-B-02 | 25 | 3.62 | −5.3 | 3.43 |
| EX1-02 | EX-A-01 | EX-B-02 | 35 | 3.65 | −0.9 | 3.62 |
| EX1-03 | EX-A-01 | EX-B-02 | 45 | 3.59 | −4.1 | 3.44 |
| EX1-04 | EX-A-02 | EX-B-02 | 25 | 3.64 | −5.2 | 3.45 |
| EX1-05 | EX-A-02 | EX-B-02 | 35 | 3.64 | −2.9 | 3.54 |
| EX1-06 | EX-A-02 | EX-B-02 | 45 | 3.57 | −6.8 | 3.33 |

Fr B = fraction of Compound B in the mixture

TABLE 5b

PD and ID10 of Compound C from polycrystalline Compound A with narrow span and polycrystalline Compound B in Example 1 (referred to as "CEX1 (Type 1)")

| Comp. C ID | Comp. A | Comp. B | Fr B % | PD g/cm$^3$ | ID10 % | PD/100 * (100 + ID10) g/cm$^3$ |
|---|---|---|---|---|---|---|
| CEX1-01 | EX-A-01 | CEX-B-03 | 25 | 3.44 | −20.8 | 2.72 |
| CEX1-02 | EX-A-01 | CEX-B-03 | 35 | 3.41 | −21.6 | 2.67 |

TABLE 5b-continued

PD and ID10 of Compound C from polycrystalline Compound A with narrow span and polycrystalline Compound B in Example 1 (referred to as "CEX1 (Type 1)")

| Comp. C ID | Comp. A | Comp. B | Fr B % | PD g/cm$^3$ | ID10 % | PD/100 * (100 + ID10) g/cm$^3$ |
|---|---|---|---|---|---|---|
| CEX1-03 | EX-A-01 | CEX-B-03 | 45 | 3.39 | −26.8 | 2.48 |
| CEX1-04 | EX-A-01 | CEX-B-04 | 25 | 3.41 | −47.2 | 1.80 |
| CEX1-05 | EX-A-01 | CEX-B-04 | 35 | 3.43 | −42.9 | 1.96 |
| CEX1-06 | EX-A-01 | CEX-B-04 | 45 | 3.41 | −42.1 | 1.97 |
| CEX1-07 | EX-A-02 | CEX-B-03 | 25 | 3.51 | −20.8 | 2.78 |
| CEX1-08 | EX-A-02 | CEX-B-03 | 35 | 3.46 | −24.0 | 2.63 |
| CEX1-09 | EX-A-02 | CEX-B-03 | 45 | 3.41 | −28.9 | 2.43 |
| CEX1-10 | EX-A-02 | CEX-B-04 | 25 | 3.49 | −44.1 | 1.95 |
| CEX1-11 | EX-A-02 | CEX-B-04 | 35 | 3.49 | −36.1 | 2.23 |
| CEX1-12 | EX-A-02 | CEX-B-04 | 45 | 3.45 | −34.4 | 2.26 |

TABLE 5c

PD and ID10 of Compound C from Polycrystalline Compound A with broad span and monolithic Compound B in Example 1 (referred to as "CEX1 (Type 2)")

| Comp. C ID | Comp. A | Comp. B | Fr B % | PD g/cm$^3$ | ID10 % | PD/100 * (100 + ID10) g/cm$^3$ |
|---|---|---|---|---|---|---|
| CEX1-13 | CEX-A-01 | EX-B-02 | 15 | 3.65 | −20.2 | 2.91 |
| CEX1-14 | CEX-A-01 | EX-B-02 | 25 | 3.67 | −17.4 | 3.03 |
| CEX1-15 | CEX-A-01 | EX-B-02 | 35 | 3.62 | −13.1 | 3.15 |

TABLE 5d

PD and ID10 of Compound C from Polycrystalline Compound A with broad span and polycrystalline Compound B in Example 1 (referred to as "CEX1 (Type 3)")

| Comp. C ID | Comp. A | Comp. B | Fr B % | PD g/cm$^3$ | ID10 % | PD/100 * (100 + ID10) g/cm$^3$ |
|---|---|---|---|---|---|---|
| CEX1-16 | CEX-A-01 | CEX-B-03 | 15 | 3.55 | −30.1 | 2.48 |
| CEX1-17 | CEX-A-01 | CEX-B-03 | 25 | 3.48 | −27.9 | 2.51 |
| CEX1-18 | CEX-A-01 | CEX-B-03 | 35 | 3.45 | −26.8 | 2.53 |
| CEX1-19 | CEX-A-01 | CEX-B-04 | 15 | 3.47 | −32.6 | 2.34 |
| CEX1-20 | CEX-A-01 | CEX-B-04 | 25 | 3.47 | −35.9 | 2.22 |
| CEX1-21 | CEX-A-01 | CEX-B-04 | 35 | 3.46 | −34.8 | 2.25 |

Figure 3:
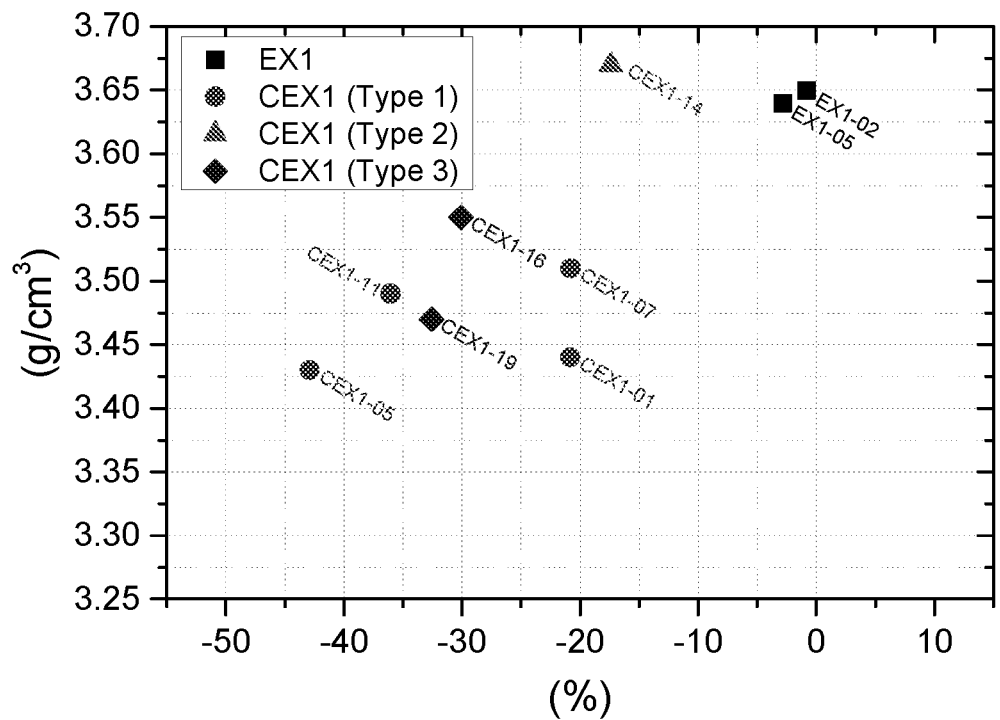
FIG. 3. PD (y axis—in g/cm³) as function of ID10 (x axis—in %) in Example 1

FIG. 3 gives the PD (y axis) and ID10 (x axis) of a selection of the samples of Example 1. In the Figure, among the different fraction ratios of Compound B in each mixture, only the sample which has the highest PD is plotted. Although CEX1 (Type 2) with Example CEX1-14 has a the highest PD, its compressive strength derived from the ID10 value is not as good as that of EX1 due to the use of a large polycrystalline compound A with broad span, resulting in a lower value for "PD×(100+ID10)÷100". CEX1 (Type 3) samples generally have an inferior PD and compressive strength compared to EX1 samples. The data in Tables 5b and 5d compared to 5c show that the influence of using small polycrystalline particles for Compound B is larger than when for Compound A a "normal" broad span is used. From the data it is possible to distinguish between the mixtures according to the invention and those not part of the invention by setting a limit as follows: PD×(100+ID10)÷100>3.20 g/cm$^3$, and preferably ≥3.30 g/cm$^3$.

Example 2

This example illustrates the benefit of bimodal mixtures comprising monolithic small lithium transition metal oxides which have a well-defined particle size. All products in Example 2 (Compound C) are obtained by a simple blending process using Compounds A and B of the Manufacturing Examples 1-3. Based on the fraction of B in Tables 6a~6e, Compound A and Compound B are weighed in vials and the vials are shaken by a tubular mixer. The obtained Compound C samples are analyzed by PD and BET measurement and the results are shown in Tables 6a~6e.

TABLE 6a

PD and IB of Comp. C from polycrystalline Comp. A with narrow span and D50 = 11 μm, and monolithic Comp. B according to the invention (referred to as "EX2 (type1)")

| Comp. C ID | Comp. A | Comp. B | Fr B % | PD g/cm$^3$ | IB % | PD/100 * (100 − IB) g/cm$^3$ |
|---|---|---|---|---|---|---|
| EX2-01 | EX-A-03 | EX-B-01 | 20 | 3.47 | NA | NA |
| EX2-02 | EX-A-03 | EX-B-01 | 40 | 3.51 | 3.5 | 3.39 |
| EX2-03 | EX-A-03 | EX-B-01 | 60 | 3.42 | NA | NA |
| EX2-04 | EX-A-03 | EX-B-02 | 20 | 3.43 | 3.2 | 3.32 |
| EX2-05 | EX-A-03 | EX-B-02 | 40 | 3.48 | −2.3 | 3.56 |
| EX2-06 | EX-A-03 | EX-B-02 | 60 | 3.42 | 2.0 | 3.36 |

Fr B = fraction of Compound B in the mixture

TABLE 6b

PD and IB of Comp. C from polycrystalline Compound A with narrow span and D50 = 20 μm, and monolithic Comp. B according to the invention (ref. to as "EX2 (type 2)")

| Comp. C ID | Comp. A | Comp. B | Fr B % | PD g/cm$^3$ | IB % | PD/100 * (100 − IB) g/cm$^3$ |
|---|---|---|---|---|---|---|
| EX2-07 | EX-A-04 | EX-B-02 | 20 | 3.66 | 12.6 | 3.20 |
| EX2-08 | EX-A-04 | EX-B-02 | 40 | 3.67 | 3.5 | 3.54 |
| EX2-09 | EX-A-04 | EX-B-02 | 60 | 3.53 | 4.2 | 3.38 |

TABLE 6c

PD and IB of Compound C with fraction of Compound B outside the invention

| Comp. C ID | Comp. A | Comp. B | Fr B % | PD g/cm$^3$ | IB % | PD/100 * (100 − IB) g/cm$^3$ |
|---|---|---|---|---|---|---|
| CEX2-00 | EX-A-04 | EX-B-02 | 10 | 3.59 | 52.8 | 1.69 |

TABLE 6d

PD and IB of Compound C from polycrystalline Compound A with narrow span and monolithic Compound B outside of the invention (referred to as "CEX2 (Type 1)")

| Comp. C ID | Comp. A | Comp. B | Fr B % | PD g/cm$^3$ | IB % | PD/100 * (100 − IB) g/cm$^3$ |
|---|---|---|---|---|---|---|
| CEX2-01 | EX-A-03 | CEX-B-01 | 30 | 3.35 | NA | NA |
| CEX2-02 | EX-A-03 | CEX-B-01 | 40 | 3.35 | NA | NA |
| CEX2-03 | EX-A-03 | CEX-B-02 | 20 | 3.27 | NA | NA |
| CEX2-04 | EX-A-03 | CEX-B-02 | 40 | 3.31 | NA | NA |
| CEX2-05 | EX-A-03 | CEX-B-02 | 60 | 3.34 | NA | NA |

TABLE 6e

PD and IB of Compound C from polycrystalline Compound A with narrow span and polycrystalline Compound B (referred to as "CEX2 (Type 2)")

| Comp. C ID | Comp. A | Comp. B | Fr B % | PD g/cm$^3$ | IB % | PD/100 * (100 − IB) g/cm$^3$ |
|---|---|---|---|---|---|---|
| CEX2-06 | EX-A-03 | CEX-B-03 | 20 | 3.37 | 28.2 | 2.42 |
| CEX2-07 | EX-A-03 | CEX-B-03 | 40 | 3.43 | 61.0 | 1.34 |
| CEX2-08 | EX-A-03 | CEX-B-03 | 50 | 3.35 | 46.0 | 1.81 |
| CEX2-09 | EX-A-03 | CEX-B-04 | 20 | 3.33 | 61.9 | 1.27 |
| CEX2-10 | EX-A-03 | CEX-B-04 | 40 | 3.41 | 96.5 | 0.12 |
| CEX2-11 | EX-A-03 | CEX-B-04 | 50 | 3.37 | 73.1 | 0.91 |
| CEX2-12 | EX-A-04 | CEX-B-03 | 20 | 3.60 | 16.8 | 2.99 |
| CEX2-13 | EX-A-04 | CEX-B-03 | 30 | 3.57 | 30.3 | 2.49 |
| CEX2-14 | EX-A-04 | CEX-B-03 | 35 | 3.55 | 35.5 | 2.29 |

Figure 4:
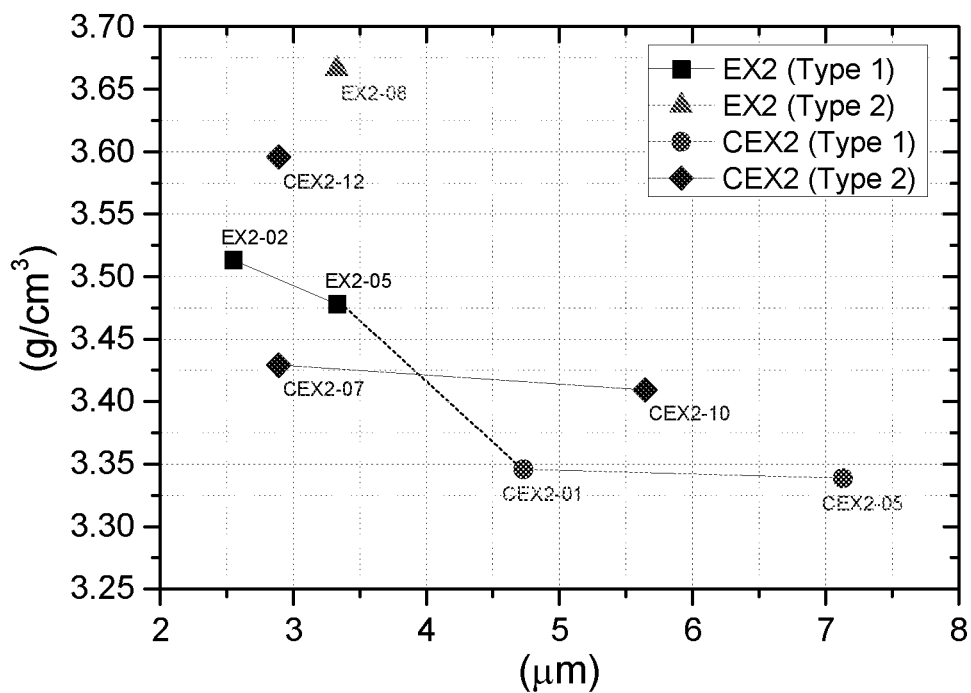
FIG. 4. PD (y axis—in g/cm³) as function of the D50 of compound B (x axis—in μm) in Example 2

FIG. 4 shows the PD (y axis) as a function of the D50 of compound B (x axis). Among the different mixtures of Compounds A and B, the samples with the highest PD are plotted. EX2 (Type 1) samples are mixtures of large polycrystalline compounds with D50 of 11 μm and small monolithic compounds B with the D50 of 2~4 μm. EX2 (Type 2) are mixtures of a large polycrystalline compound with D50 of 20 μm and small monolithic compound B. Due to the use of bigger polycrystalline compounds, the PD of EX2 (Type 2) sample is high. When the D50 of Compound B is higher than 4 μm in CEX2 (Type 1), the PD decreases. Therefore, the D50 of Compound B should be less than 4 μm. CEX2 (Type 2) samples are mixtures of large polycrystalline compounds A and small polycrystalline compounds B. The PD of CEX2 (Type 2) clearly depends on the D50 of Compound A, and for the D50=11 μm (EX-A-03), the PD is not as high as that of EX2 (Type 2). The effect is less clear for compound A having a D50=20 μm (EX-A-04). It is also clear that the IB of CEX2 (Type 2) is higher than that of EX2 (Types 1 & 2). Therefore the influence of the increase in BET was taken into account and the value of "PD×(100−IB)÷100" was calculated, expressing the influence of the morphology of Compound B, taking into account that the increase of BET has a negative influence on the cycle stability of the final product. From the data it is possible to distinguish between the mixtures according to the invention and those not part of the invention by setting a limit as follows: PD×(100−IB)÷100>3.00 g/cm³, and preferably ≥3.20 g/cm³.

Figure 5:
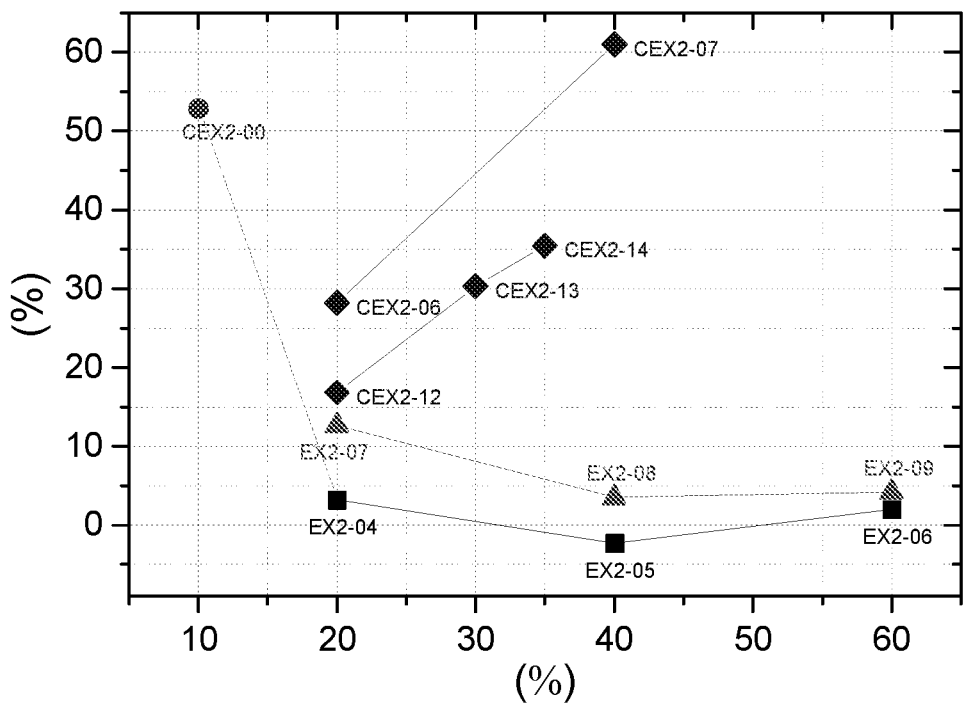
FIG. 5. IB (y axis—in %) as function of the fraction of Compound B (x axis—in %) in Example 2

FIG. 5 shows the increase of BET after pressing (IB in %, y axis) as a function of the fraction ratio of Compound B (in wt %, x axis). For CEX2-00 the amount of Compound B is too low and the increase of BET is too important. The BET of CEX2 (Type 2) samples depends on the D50 of Compound A, and significantly increases after pressing as a function of the ratio of Compound B, indicating that Compound B has no "cushioning" or "buffering" effect when it is a polycrystalline compound. This is not the case for EX2 (Type 1&2) samples.

Example 3

Samples of non-mixed CEX-A-02 & EX-A-03, and mixed CEX2-07 & EX2-05 are used to prepare a positive electrode for measuring the electrode density as well as to quantify the degree of electrode biting. The electrodes are labelled CEX3-01, CEX3-02, CEX3-03, and EX3, respectively. A relative electrode biting (R.E.B.) number in % is obtained by the following equation:

$$R.E.B. = \frac{\text{The area of Al foil before calendaring} - \text{The area of Al foil after calendaring}}{\text{The area of Al foil after calendaring}} \text{ (in \%)}$$

The area is the cross section Al foil area in a cut perpendicular to the electrode surface.

Figure 6:
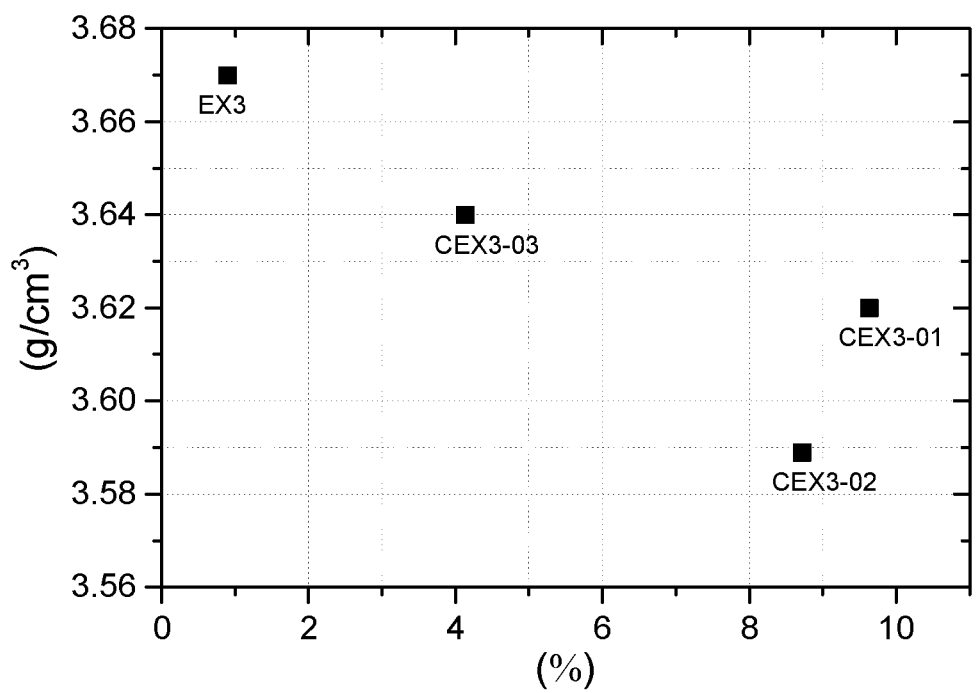
FIG. 6. ED (y axis—in g/cm³) as function of R.E.B. (x axis—in %) in Example 3

Table 7 and FIG. 6 show the electrode density (E.D.) and relative electrode biting (R.E.B) of CEX3-01, CEX-02, CEX-03, and EX3.

TABLE 7

Electrode density (E.D.) and relative electrode biting (R.E.B.) of different positive electrodes (comparing each time the area of EX3 and the given electrode)

| Electrode ID | Comp. C | E.D. g/cm³ | R.E.B. % |
|---|---|---|---|
| CEX3-01 | CEX-A-02 | 3.62 | 9.6 |
| CEX3-02 | EX-A-03 | 3.59 | 8.7 |
| CEX3-03 | CEX2-07 | 3.64 | 4.1 |
| EX3 | EX2-05 | 3.67 | 0.9 |

Figure 7:
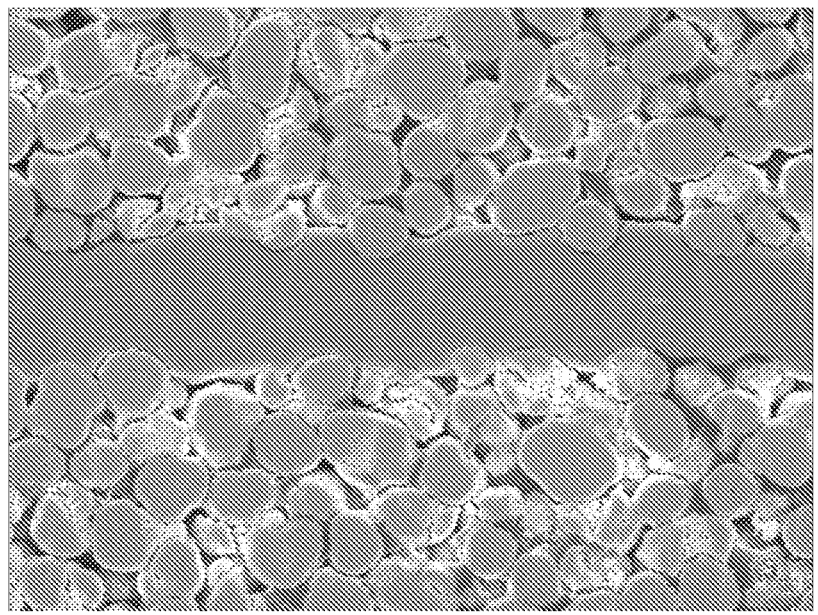
FIG. 7. Cross section FE-SEM image (magnification ×1000) of CEX3-02
Figure 8:
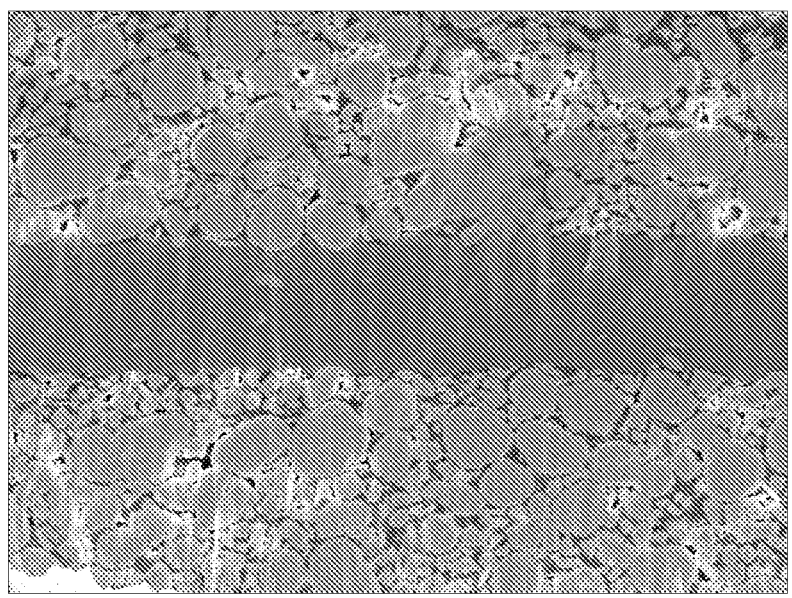
FIG. 8. Cross section FE-SEM image (magnification ×1000) of EX3

The higher R.E.B. means that the area of Al foil in the electrodes after calendaring is smaller than that before calendaring. It can be expected that the cut area of Al foil is smaller when the Al foil undergoes a compressive stress during the calendaring process. EX3, of which the positive electrode material is EX2-05, has the lowest relative electrode biting as well as the highest electrode density. FIGS. 7 and 8 show the cross section FE-SEM images of CEX3-02 and EX3, with the Al foil in the center. The "cushioning" effect of the small monolithic particles in EX3 is clearly visible.

Example 4

This example further illustrates the benefit of bimodal mixtures with small monolithic compounds in terms of electrochemical properties, when using a surface treated Compound C. This surface treated product is prepared by the following steps:

1) $1^{st}$ blending: EX2-05 is blended with 0.2 wt % nanometric alumina powder in a Henschel mixer for 30 minutes, 2) $1^{st}$ heat treatment: the blend from the $1^{st}$ blending step is heated at 750° C. for 5 hours in an oxygen containing atmosphere in a chamber furnace, 3) $2^{nd}$ blending: the $1^{st}$ surface treated product is again blended with 0.2 wt % nanometric alumina powder and 0.3% PVDF (Polyvinylidene fluoride) powder by weight in a Henschel mixer for 30 minutes, 4) $2^{nd}$ heat treatment: the blend from the $2^{nd}$ blending step is heated at 375° C. for 5 hours in an oxygen containing atmosphere in a chamber furnace, 5) Post treatment: the surface treated product is sieved to avoid the formation of agglomerates and labelled EX4.

The preferred source of Al is a nanometric alumina powder, for example fumed alumina. The alumina can be obtained by precipitation, spray drying, milling, etc. In one embodiment the alumina typically has a BET of at least 50 m²/g and consists of primary particles having a D50<100 nm, the primary particles being non-aggregated. In another embodiment fumed alumina or surface treated fumed alumina is used. Fumed alumina nanoparticles are produced in high temperature hydrogen-air flames and are used in several applications that involve products of everyday use.

A typical example of the polymeric PVDF powder is a PVDF homopolymer or PVDF copolymer (such as HYLAR® or SOLEF® PVDF, both from Solvay SA, Belgium). Another known PVDF based copolymer is for example a PVDF-HFP (hexa-fluoro propylene). The specific PVDF grade used in this example is Kynar Flex 2801-00 from Arkema which is a PVDF copolymer resin.

The selection of the sintering temperature in the $1^{st}$ heat treatment results in the doping of the lithium metal oxide core by the element Al. In the $2^{nd}$ heat treatment, due to the lower sintering temperature, the crystalline structure of the alumina is maintained during the coating process and is found in the coating layer surrounding the lithium metal oxide core. Also in the second sintering step, the fluorine-containing polymer—which is free of Li—starts to decompose in contact with the core material. The polymer is completely decomposed and lithium fluoride is formed, which is found in the surface layer of the particles. The LiF originates from the reaction of the decomposing polymer with lithium containing surface base (which—as explained in WO2012/107313—is composed of LiOH and $Li_2CO_3$) of the lithium transition metal oxides. Whereas a normal fluoride containing polymer just melts upon heating, it can be established that the contact with the Li (soluble) base on the surface of the transition metal oxide initiates a chemical reaction leading to the decomposition of the polymer.

CEX4-01 and CEX4-02 are prepared by the same procedure as EX4 except that EX-A-03 and CEX-A-02 (that is: only compound A) are used in $1S^t$ blending instead of EX2-05, respectively. Table 8 shows the core materials before surface treatments and full cell bulging test result at 4.35V.

TABLE 8

Full cell bulging of surface treated samples

| Surface treated sample ID | Core compound ID | Description of core compound | Full cell Bulging % |
|---|---|---|---|
| EX4 | EX2-05 | EX-A-03 with monolithic filler | 8 |
| CEX4-01 | EX-A-03 | Polycrystalline NMC with narrow span | 12 |
| CEX4-02 | CEX-A-02 | Polycrystalline NMC with broad span | 29 |

Figure 9:
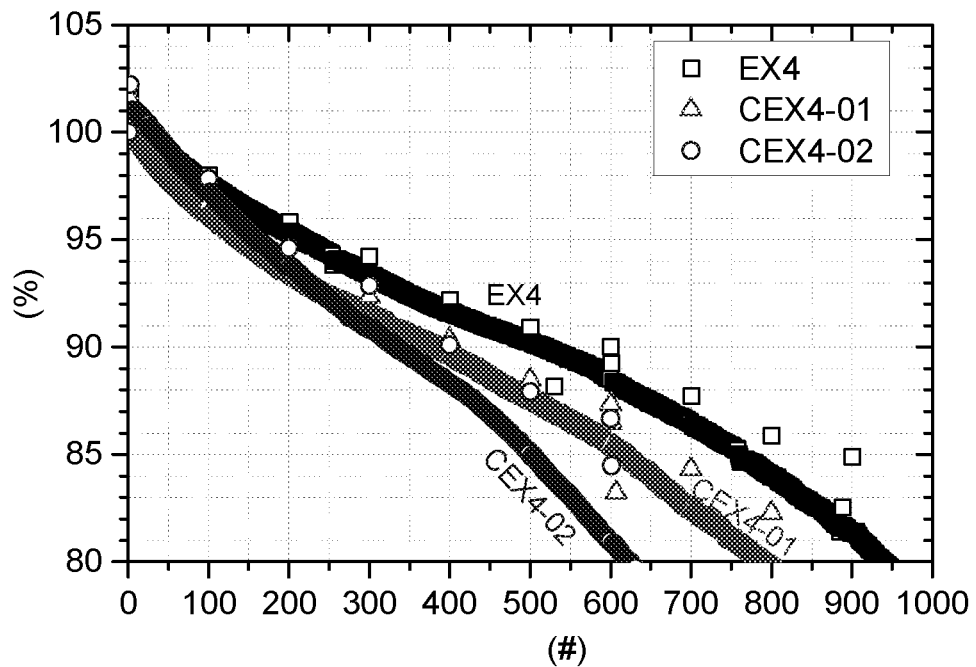
FIG. 9. Relative capacity (y axis—in %) as function of full cell cycle number in Example 4, where the full cell cycling condition is 4.35V-3.00V at 45° C.

The full cell bulging in Table 8 shows that EX4, the coated mixture of the polycrystalline NMC with narrow span and monolithic filler, has a lower thickness increase during the bulging test than CEX4-01 and CEX4-02. FIG. 9 shows the full cell cycle life of EX4, CEX4-01, and CEX4-02 at 4.35V-3.00V in 650 mAh pouch cells, which is a relatively high voltage range for NMC compounds. EX4 has a better cycle stability than CEX4-01 and CEX4-02.

Manufacturing Example 4

This example illustrates a manufacturing processes to produce a large spherical monolithic LCO that is used as Compound A in the example. EX-A-05 has the composition of $Li(Co_{0.979}Al_{0.015}Mg_{0.005}Ti_{0.001})O_2$ and is prepared by the following steps:

1) Precipitation of a doped cobalt carbonate: a narrow span doped cobalt carbonate is prepared using a single batch stirred tank reactor (STR) precipitation technique. The temperature of the STR is set at 55° C. The STR is filled with a mixture of solutions of cobalt chloride, 1.5 mol % aluminium sulfate, 0.5 mol % magnesium sulfate and ammonium bisulfate that are simultaneously pumped into the reactor. When the D50-particle size of the precursor reaches around 35 μm, the precursor slurry is collected. The collected precursor slurry is filtered and washed by de-ionized water, and then dried for obtaining a doped cobalt carbonate $((Co_{0.980}Al_{0.015}Mg_{0.005})CO_3)$.

2) Roasting of the doped cobalt carbonate: the doped cobalt carbonate is roasted in a roller hearth kiln (RHK) at 600° C. for 8 hours to prepare doped cobalt oxide.

3) $1^{st}$ Blending: the prepared doped cobalt oxide is blended with $Li_2CO_3$ as a source of lithium, with a target molar Li/(Co+Al) ratio of 1.03, though a dry blending method.

4) $1^{st}$ Firing and post treatment: the mixture from step 3) is loaded in an mullite tray and fired at 1020° C. under dry air atmosphere for 12 hours in a RHK. The obtained $1^{st}$ sintered cake is crushed to obtain a lithium excess intermediate product.

5) $2^{nd}$ blending: the lithium excess intermediate product is blended with 0.1 mol % $TiO_2$ and the doped cobalt oxide in order to correct the Li stoichiometry to Li/(Co+Al)=1.00. The blending is performed in a Henschel mixer for 30 minutes.

4) $2^{nd}$ sintering: the blend from the $2^{nd}$ blending is sintered at 980° C. for 12 hours in an oxygen containing atmosphere in a chamber furnace.

5) Post-treatment: the $2^{nd}$ sintered product is grinded and sieved to avoid the formation of agglomerates. The final product is a monolithic LCO $Li(Co_{0.979}Al_{0.015}Mg_{0.005}Ti_{0.001})O_2$ and is labelled EX-A-05.

Table 9 shows the PSD of the precursors and the PSD, PD, ID10 (D10 increase after pressing), coin cell discharge capacity of EX-A-05.

TABLE 9

PSD, PD, and DQ1 of the large monolithic LCO

| Compound A ID | PSD of precursor (doped $CoCO_3$) | | PSD of product (Compound A) | | PD g/cm³ | ID10 % | Coin cell DQ1 mAh/g |
|---|---|---|---|---|---|---|---|
| | D50 μm | SPAN | D50 μm | SPAN | | | |
| EX-A-05 | 33 | 0.3 | 28.2 | 0.7 | 4.01 | −15.4 | 154 |

Example 5

This example illustrates the benefit of a bimodal composition comprising large monolithic LCO having a narrow span and monolithic small lithium transition metal oxides. All products in Example 5 (Compound C) are obtained by a simple blending process using Compounds A and B which are described in Manufacturing Examples 4 and 3. Based on the fraction of B in Table 10, Compound A and Compound B are weighed in vials and the vials are shaken by a tubular mixer. The obtained Compound C samples are analyzed by PD, PSD, coin cell, and full cell measurement and the results are shown in Table 10. 1600 mAh pouch cells are used for the full cell tests and upper/lower cut-off voltages are 4.45V/3.00V. CEX5-03 is CellCore XD20 from Umicore which is commercially available state of the art bimodal doped LCO product, and is prepared according to Example 1 of WO2012/171780.

TABLE 10

PD and ID10 of Compound C from polycrystalline Compound A with narrow span and monolithic Compound B in Example 5

| Comp. D ID | Comp. A | Comp. B | Fr B % | PD g/cm³ | ID10 % | Coin Cell DQ1 mAh/g | Coin cell Energy density mWh/cm³ | Full cell Bulging % |
|---|---|---|---|---|---|---|---|---|
| CEX5-01 | EX-A-05 | EX-B-02 | 10 | 4.12 | | | | |
| EX5 | EX-A-05 | EX-B-02 | 20 | 4.16 | −4.9 | 159 | 2621 | 42 |
| CEX5-02 | EX-A-05 | EX-B-02 | 30 | 4.02 | | | | |
| CEX5-03 | Commercial LCO | | | 4.00 | | 161 | 2550 | 304 |

Fr B = fraction of Compound B in the mixture

EX-A-05, which is a large monolithic doped LCO Compound A, has a relatively high pressed density and lower DQ1 than NMC compounds due to the intrinsic property of monolithic LCO compounds. The pressed density can be further improved by mixing in a small monolithic NMC compound with optimum fraction of 20%. Due to higher capacity of the monolithic NMC, EX5 has a higher capacity than EX-A-05. Higher PD and higher DQ1 result in higher volumetric energy density of EX5.

Figure 10:
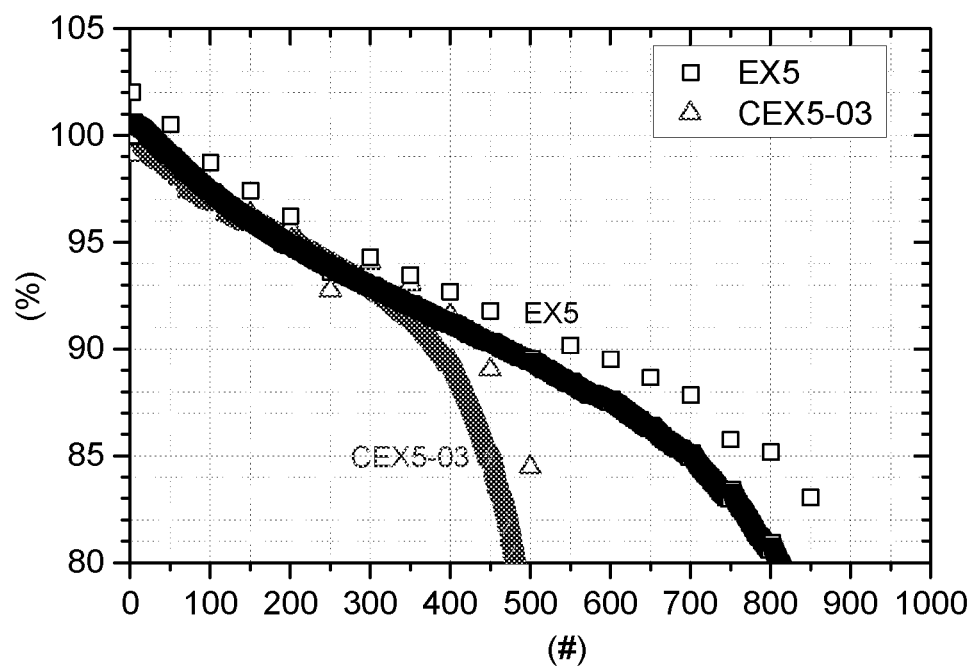
FIG. 10. Relative capacity (y axis—in %) as function of full cell cycle number in Example 5, where the full cell cycling condition is 4.45V-3.00V at 25° C.

The swelling of a battery at a high voltage such as 4.45V is one of the biggest issues in high voltage applications. For example, the thickness of the full cell pouch cell produced by CEX5-03 increases by 300% after the bulging test. The thickness of the full cell pouch cell produced by EX5 increases much less than CEX5-03. A full cell test is performed and FIG. 10 shows the relative capacity as function of full cell cycle number. It is clear that EX5 has better cycle stability than CEX5-03.

The invention claimed is:

1. A bimodal lithium transition metal oxide based powder mixture for a rechargeable battery, comprising:
   a first lithium transition metal oxide based powder, comprising particles of a material A having a layered crystal structure comprising the elements Li, a transition metal based composition M and oxygen, wherein the particles of material A have a general formula $Li_{1+a}Co_{1-m}M'_mO_2$, with $-0.05 \leq a \leq 0.05$ and $0 \leq m \leq 0.05$, the material A having a $D50 \geq 20$ μm, and wherein M' is one or more metals of the group consisting of Al, Ca, Si, Ga, B, Ti, Mg, W, Zr, Cr and V, the first powder having a particle size distribution with a span <1.0; and
   a second lithium transition metal oxide based powder, comprising a material B having a monolithic morphology, said particles having a general formula $Li_{1+b}N'_{1-b}O_2$, wherein $-0.03 \leq b \leq 0.10$, and $N'=Ni_xM''_yCo_zE_d$, wherein $0.30 \leq x \leq 0.92$, $0.05 \leq y \leq 0.40$, $0.05 \leq z \leq 0.40$ and $0 \leq d \leq 0.10$, with M" being one or both of Mn or Al, and with E being a dopant different from M", the first powder having an average particle size D50 between 10 and 40 μm, the second powder having an average particle size D50 between 2 and 4 μm; and
   wherein the weight ratio of the second powder in the bimodal mixture is between 15 and 60 wt %.

2. The bimodal powder mixture of claim 1, wherein the weight ratio of the second powder in the bimodal mixture is between 15 and 25 wt %.

3. The bimodal powder mixture of claim 1, wherein E is one of more elements of the group consisting of Al, Ca, Si, Ga, B, Ti, Mg, W, Zr, Cr, V, S, F and N.

4. The bimodal powder mixture of claim 1, wherein the first powder has an average particle size D50 between 10 and 25 μm and a span ≤0.8.

5. The bimodal powder mixture of claim 1, wherein both the first and the second powder have an aspect ratio near to 1.

6. The bimodal powder mixture of claim 1, wherein the bimodal powder has a first corrected pressed density ≥3.2 g/cm³, wherein the first corrected pressed density is calculated with the formula PD/100×(100+ID10); wherein PD is the pressed density under a pressure of 200 MPa and ID10 is the increase of the D10 value in the particle size distribution of the bimodal powder calculated as follows:

$$ID10 = \frac{D10 \text{ after } PDM - D10 \text{ before } PDM}{D10 \text{ before } PDM} \times 100 \text{ (in \%)}$$

wherein (D10 after PDM) and (D10 before PDM) are respectively the D10 values after and before the application of a pressure of 200 MPa.

7. The bimodal powder mixture of claim 1, wherein the bimodal powder has a second corrected pressed density ≥3.0 g/cm³, wherein the second corrected pressed density is calculated with the formula PD/100×(100−IB); wherein PD is the pressed density under a pressure of 200 MPa and IB is the increase of the specific surface area BET of the bimodal powder calculated as follows:

$$IB = \frac{BET \text{ after } PDM - BET \text{ before } PDM}{BET \text{ before } PDM} \times 100 \text{ (in \%)}$$

wherein (BET after PDM) and (BET before PDM) are respectively the BET values after and before the application of a pressure of 200 MPa.

8. The bimodal powder mixture of claim 1, wherein the particles of the powder mixture have a surface layer comprising an intimate mixture of the elements of M, LiF and $Al_2O_3$.

9. A positive electrode mixture for a rechargeable battery comprising the bimodal powder mixture of claim 1, a binder and a conductive agent, wherein the weight ratio of the bimodal powder mixture in the positive electrode mixture is at least 90 wt % and wherein the positive electrode mixture has a density of at least 3.65 g/cm³ when pressed under 1765.2 N.

* * * * *